United States Patent
Roberts et al.

(10) Patent No.: US 9,250,797 B2
(45) Date of Patent: Feb. 2, 2016

(54) TOUCH GESTURE INTERFACE APPARATUSES, SYSTEMS, AND METHODS

(75) Inventors: Brian Roberts, Frisco, TX (US); Donald Relyea, Dallas, TX (US); Heath Stallings, Colleyville, TX (US); Kristopher T. Frazier, Frisco, TX (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 385 days.

(21) Appl. No.: 12/242,213

(22) Filed: Sep. 30, 2008

(65) Prior Publication Data

US 2010/0083190 A1   Apr. 1, 2010

(51) Int. Cl.
*G06F 3/14* (2006.01)
*G06F 3/0488* (2013.01)
*G06F 3/0481* (2013.01)

(52) U.S. Cl.
CPC ........ *G06F 3/04883* (2013.01); *G06F 3/04886* (2013.01); *G06F 3/0481* (2013.01)

(58) Field of Classification Search
CPC ................................................. G06F 3/048831
USPC ................................................. 715/863, 864
See application file for complete search history.

(56) References Cited

U.S. PATENT DOCUMENTS

| | | | | |
|---|---|---|---|---|
| 4,933,514 A * | 6/1990 | Bowers | | 178/18.01 |
| 6,335,726 B1 * | 1/2002 | Ilan et al. | | 345/173 |
| 7,895,536 B2 * | 2/2011 | Fitzmaurice et al. | | 715/860 |
| 7,898,529 B2 * | 3/2011 | Fitzmaurice et al. | | 345/173 |
| 2002/0048413 A1 | 4/2002 | Kusunoki | | |
| 2004/0095395 A1 * | 5/2004 | Kurtenbach | | 345/810 |
| 2004/0212617 A1 * | 10/2004 | Fitzmaurice et al. | | 345/440 |
| 2005/0050476 A1 * | 3/2005 | SanGiovanni | | 715/834 |
| 2005/0144567 A1 * | 6/2005 | Kurtenbach et al. | | 715/810 |
| 2006/0026535 A1 * | 2/2006 | Hotelling et al. | | 715/863 |
| 2006/0026536 A1 * | 2/2006 | Hotelling et al. | | 715/863 |
| 2006/0242607 A1 * | 10/2006 | Hudson | | 715/863 |
| 2007/0177803 A1 | 8/2007 | Elias et al. | | |
| 2007/0250794 A1 | 10/2007 | Miura et al. | | |
| 2008/0165149 A1 * | 7/2008 | Platzer et al. | | 345/173 |
| 2008/0165151 A1 * | 7/2008 | Lemay et al. | | 345/173 |
| 2009/0007017 A1 * | 1/2009 | Anzures et al. | | 715/835 |
| 2009/0019397 A1 * | 1/2009 | Buffet et al. | | 715/837 |
| 2009/0037813 A1 * | 2/2009 | Newman et al. | | 715/702 |
| 2009/0064055 A1 * | 3/2009 | Chaudhri et al. | | 715/863 |
| 2009/0100384 A1 * | 4/2009 | Louch | | 715/863 |
| 2009/0265669 A1 * | 10/2009 | Kida et al. | | 715/863 |

(Continued)

OTHER PUBLICATIONS

Silverman, Dwight, "TechBlog", http://blogs.chron.com/techblog/archives/2008/05/updated_talkin_bout_windows_7_kinda, May 27, 2008.

(Continued)

*Primary Examiner* — William Titcomb

(57) ABSTRACT

In certain embodiments, an object touch is detected on a touch screen display, a touch gesture interface is displayed on the touch screen display in response to the object touch, a touch gesture is detected on the touch screen display, and an action is performed based on the touch gesture. In certain embodiments, the touch gesture includes a directional touch gesture in a direction away from a position of the object touch on a surface of the touch screen display. In certain embodiments, the touch gesture interface includes a plurality of selectable options, and the action includes one of navigating through the selectable options and selecting one of the selectable options.

20 Claims, 20 Drawing Sheets

(56) References Cited

U.S. PATENT DOCUMENTS

2009/0282370 A1* 11/2009 Rainwater et al. ............ 715/863
2010/0031202 A1* 2/2010 Morris et al. ................. 715/863
2010/0058252 A1* 3/2010 Ko ................................ 715/863
2010/0064261 A1* 3/2010 Andrews et al. .............. 715/863
2010/0083188 A1* 4/2010 Pance et al. ................... 715/863
2010/0146464 A1* 6/2010 Wilson et al. ................. 715/863

OTHER PUBLICATIONS

Kurtenbach, "The Design and Evaluation of Marking Menus," Degree of Doctor of Philosophy Thesis, Graduate Department of Computer Science, University of Toronto, 1993.

* cited by examiner

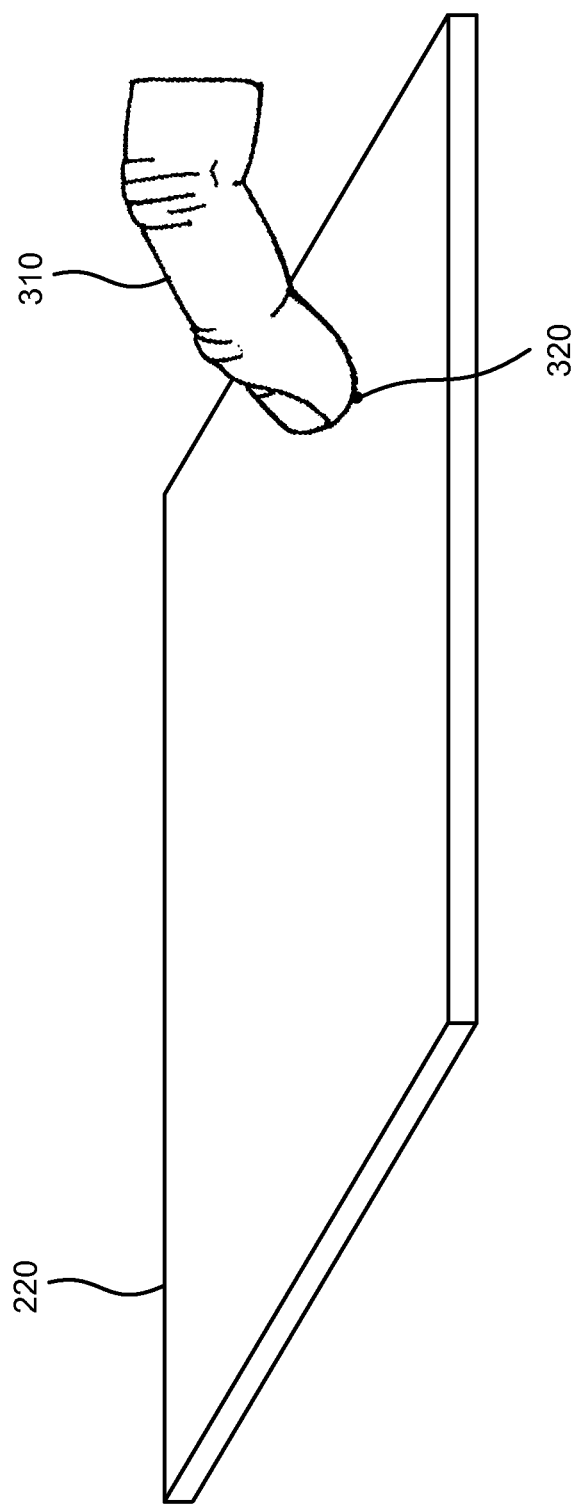

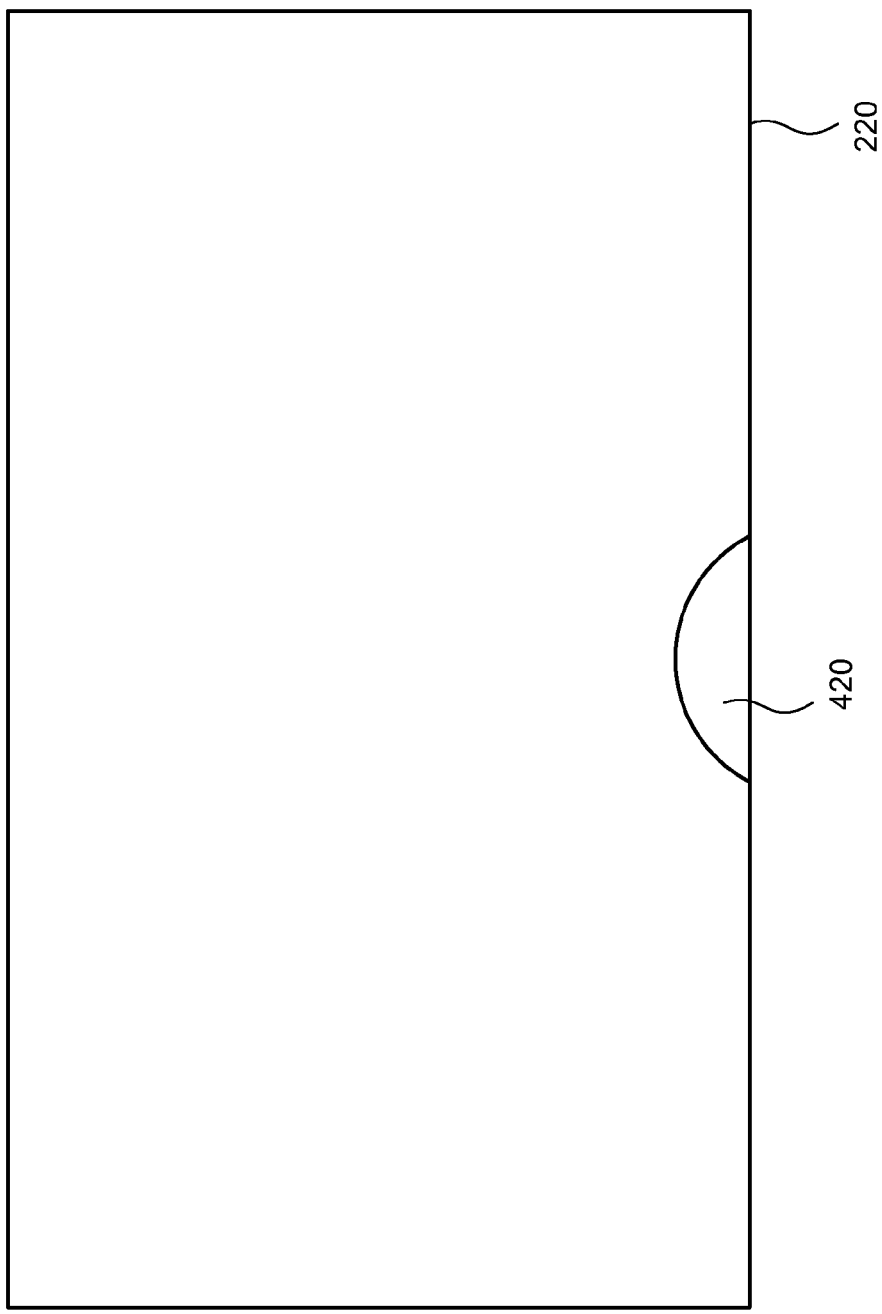

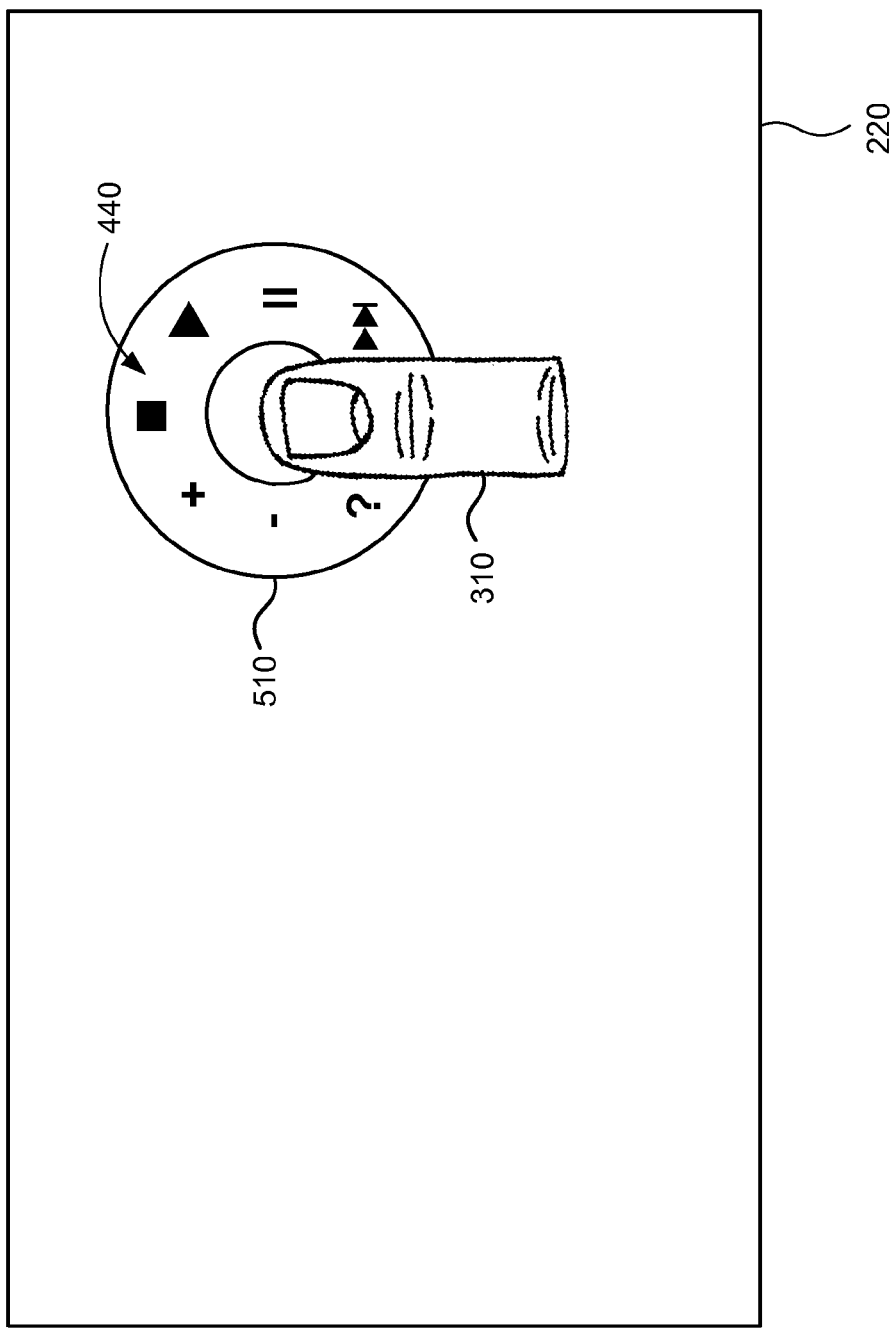

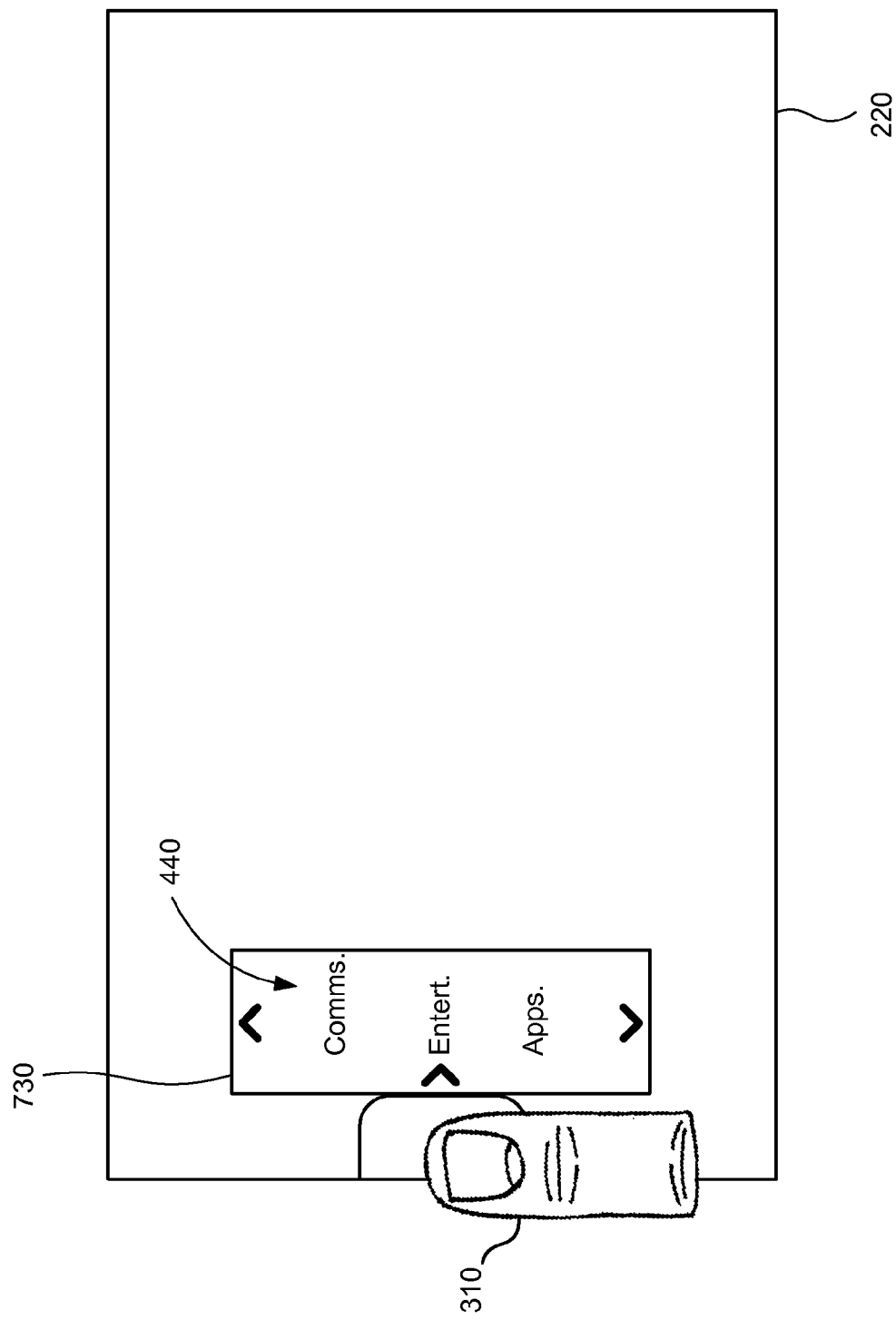

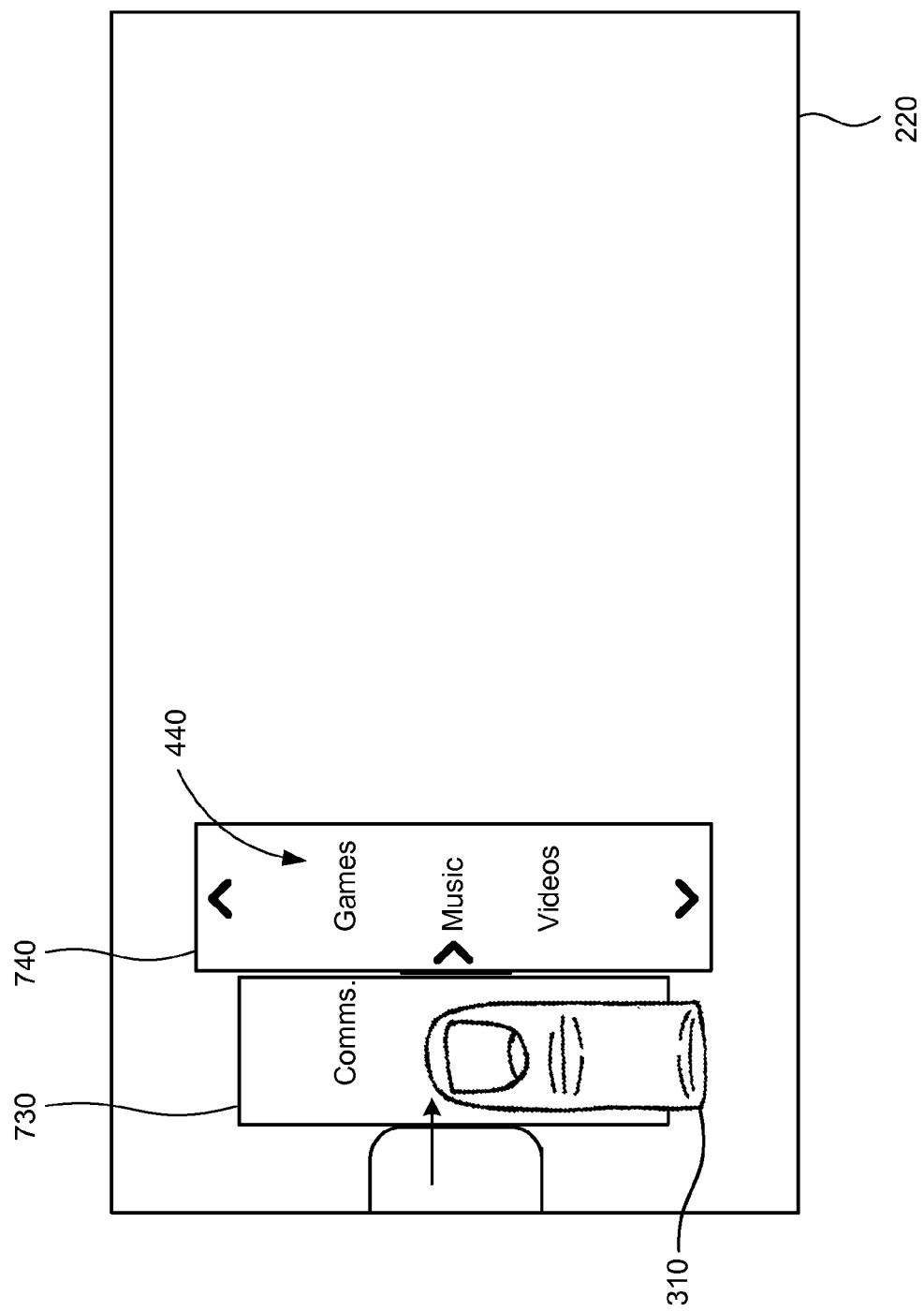

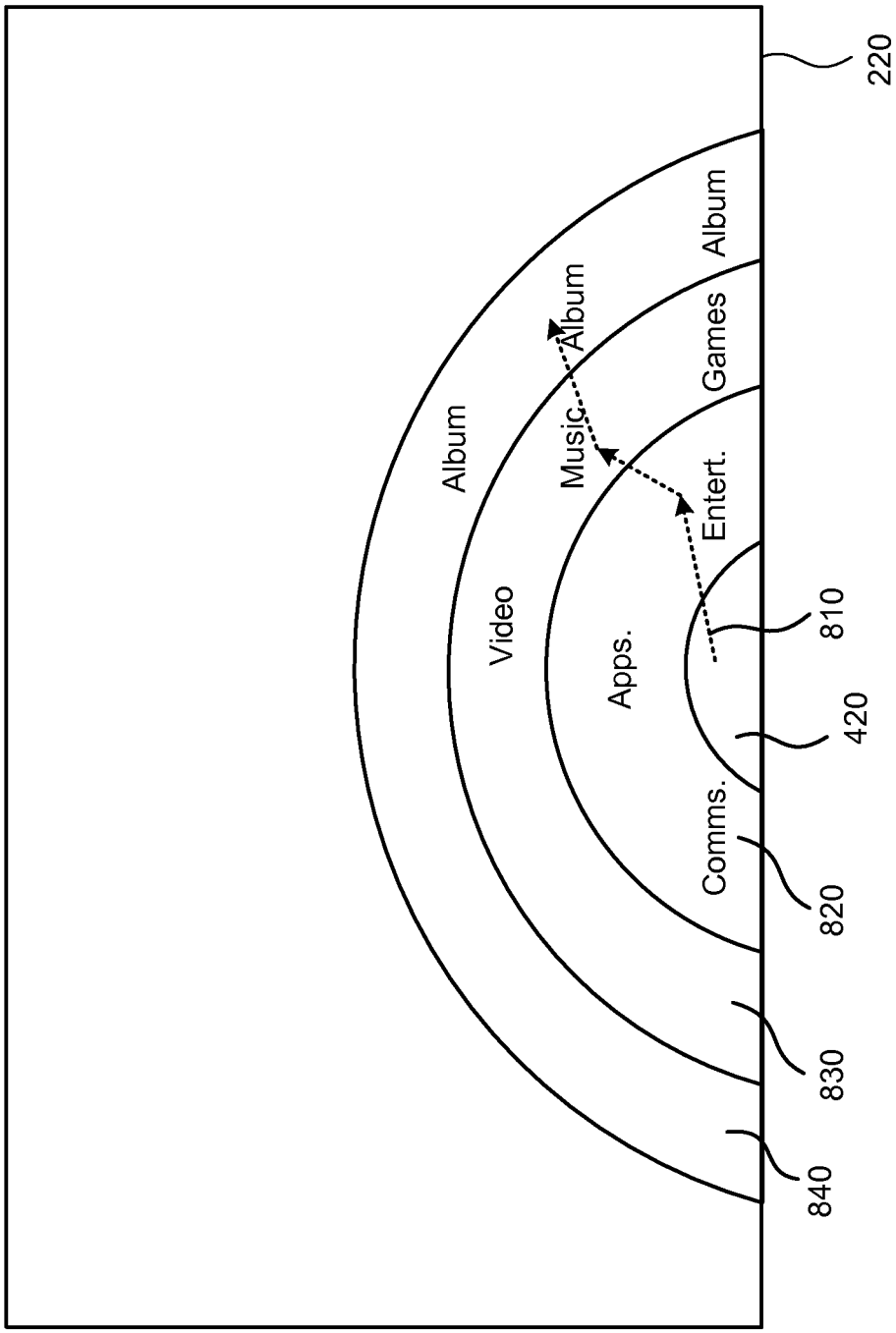

TOUCH GESTURE INTERFACE APPARATUSES, SYSTEMS, AND METHODS

BACKGROUND INFORMATION

Electronic devices continue to increase in complexity and functionality. This poses several challenges to designers of such devices. For example, it may be difficult to develop and provide an intuitive, functional, and convenient user interface for an electronic device having robust functionality, especially when the device is small in size.

Recently, touch screens have become popular user interfaces for certain electronic devices. Touch screens are especially conducive to small electronic devices at least because they allow for an expansive set of user inputs and can replace other limited input interfaces such as dedicated mechanical input buttons. However, there remains room to improve upon standard touch screen interfaces.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 3A-3C illustrate perspective views of an object touching a surface of a touch screen display.

FIGS. 4A-4C illustrate exemplary views within a graphical user interface displayed on a touch screen display.

FIGS. 5A-5C illustrate further exemplary views within a graphical user interface displayed on a touch screen display.

FIGS. 7A-7C illustrate exemplary touch gesture menu views within a graphical user interface displayed on a touch screen display.

FIG. 8 illustrates an exemplary menu application view within a graphical user interface displayed on a touch screen display.

DETAILED DESCRIPTION OF PREFERRED EMBODIMENTS

Exemplary touch gesture interface apparatuses, systems, and methods are described herein. In certain exemplary embodiments, an object touch is detected on a touch screen display, a touch gesture interface is displayed on the touch screen display in response to the object touch, a touch gesture is detected on the touch screen display, and an action is performed based on the touch gesture. In certain embodiments, the touch gesture includes a directional touch gesture in a direction away from a position of the object touch on a surface of the touch screen display. In certain embodiments, the touch gesture interface includes a plurality of selectable options, and the action includes one of navigating through the selectable options and selecting one of the selectable options. Exemplary embodiments of touch gesture interface apparatuses, systems, and methods will now be described in more detail with reference to the accompanying drawings.

Figure 1:
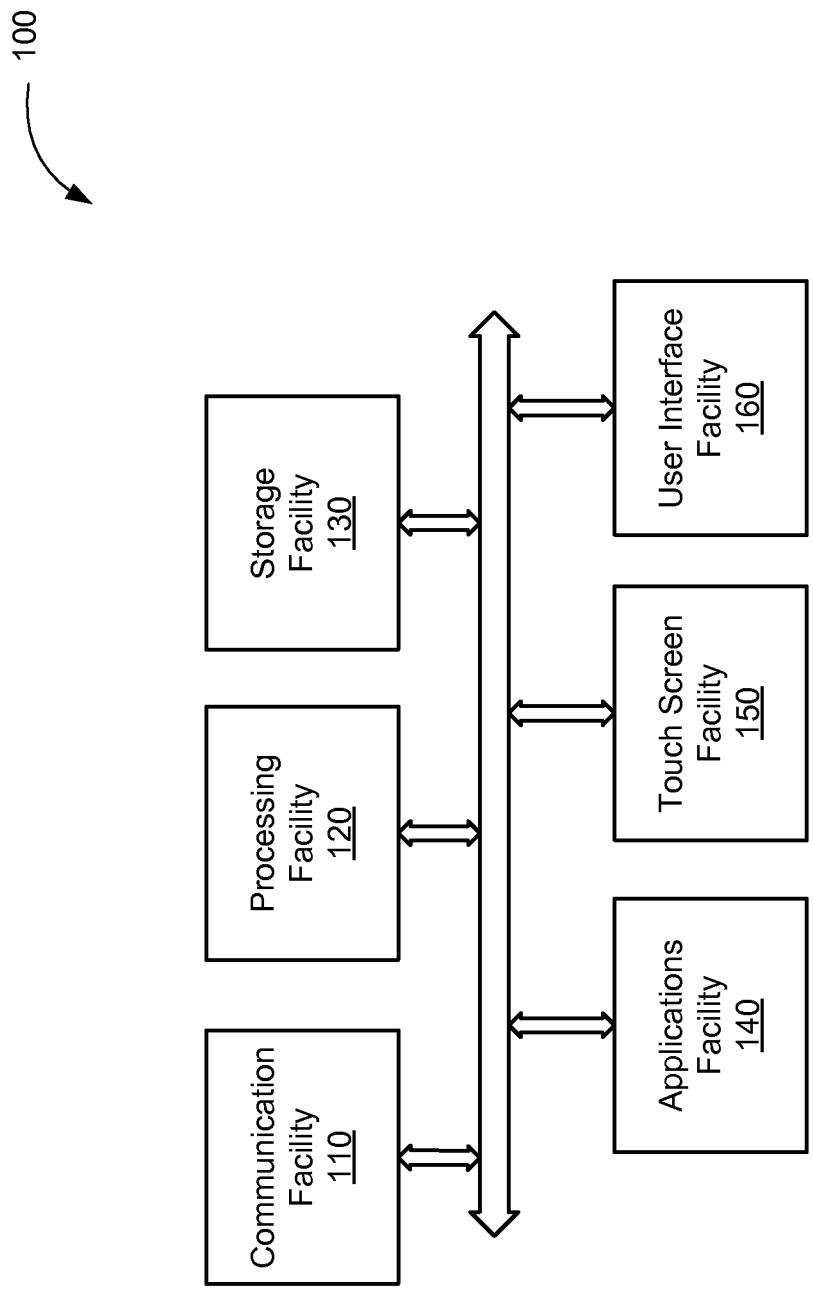
FIG. 1 illustrates a touch gesture interface system.

FIG. 1 illustrates an exemplary touch gesture interface system 100 (or simply "system 100"). As shown in FIG. 1, system 100 may include a communication facility 110, processing facility 120, storage facility 130, applications facility 140, touch screen facility 150, and user interface facility 160 communicatively connected to one another. The facilities 110-160 may be communicatively connected using any suitable technologies and may communicate using any communication platforms and/or technologies suitable for transporting communications, data, and/or signals between the facilities 110-160.

In some examples, system 100 may include any computing hardware and/or instructions (e.g., software programs), or combinations of computing instructions and hardware, configured to perform one or more of the processes described herein. In particular, it should be understood that system 100 or components of system 100 may be implemented on one physical computing device or may be implemented on more than one physical computing device. Accordingly, system 100 may include any one of a number of computing devices, and may employ any of a number of computer operating systems.

One or more of the processes described herein may be implemented at least in part as computer-executable instructions, i.e., instructions executable by one or more computing devices, tangibly embodied in a computer-readable medium. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computing device can read.

Accordingly, each of the facilities 110-160 may be implemented as hardware, computing instructions (e.g., software) tangibly embodied on a computer-readable medium, or a combination of hardware and tangibly embodied computing instructions configured to perform one or more of the processes described herein. In certain embodiments, for example, user interface facility 160 and/or one or more other facilities may be implemented as one or more software applications embodied on a computer-readable medium such as storage facility 130 or other memory and configured to direct processing facility 120 to execute one or more of the processes described herein.

The components of system 100 shown in FIG. 1 are illustrative only. Other embodiments may add, omit, or reconfigure one or more components. In certain embodiments, for example, communication facility 110 may be omitted. Each of the facilities 110-160 will now be described in more detail.

Communication facility 110 may be configured to send and/or receive communications to/from one or more external devices (e.g., a server). Communication facility 110 may include and/or employ any device, logic, communication media, communication protocols, and/or other technologies suitable for transmitting and receiving communications signals and data. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, Fiber-to-the-premises ("FTTP") technologies, Passive Optical Network ("PON") technologies, and other suitable communications networks and technologies.

Processing facility 120 may include one or more processors and may be configured to execute and/or direct execution of one or more processes or operations described herein. Processing facility 120 may direct execution of operations in accordance with computer-executable instructions such as may be stored in storage facility 130 or another computer-readable medium. As an example, processing facility 120 may be configured to process data, including demodulating, decoding, and parsing acquired data, and encoding and modulating data for transmission by communication facility 110.

Storage facility 130 may include one or more data storage media, devices, or configurations and may employ any type, form, and combination of storage media. For example, the storage facility 130 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Electronic data may be temporarily and/or permanently stored in the storage facility 130.

Applications facility 140 may include any combination of hardware, software, and/or firmware configured to execute one or more applications. In certain embodiments, applications facility 140 includes at least one software application tangibly embodied on a computer readable medium and configured to direct processing facility 120 to perform one or more application operations. Examples of such applications may include, but are not limited to, media player applications, menu applications, and communications applications (e.g., phone, messaging, and/or web browser applications).

Touch screen facility 150 may be configured to receive user input and provide user output with one or more touch screen components. Touch screen facility 150 may include any hardware, firmware, software, or combination thereof supportive of touch screen input and output capabilities. For example, touch screen facility 150 may include a touch screen having one or more sensors configured to sense one or more objects touching a surface of the touch screen. An object touch on the touch screen may be sensed in any suitable way and using any suitable sensor technologies, including capacitance, heat, and/or optic sensor technologies, for example.

Touch screen facility 150 may be further configured to present output to a user. For example, touch screen facility 150 may include one or more components configured to display a graphical user interface ("GUI") on a touch screen for viewing by a user. Any suitable display components and technologies may be employed by touch screen facility 150. Exemplary GUI views that may be displayed on a touch screen by touch screen facility 150 are described further below.

The touch screen may be configured to concurrently display one or more GUIs and to sense one or more object touches on the touch screen. Accordingly, touch screen may be referred to as a "touch screen display." As described further below, the touch screen may display a GUI and sense one or more object touches on the touch screen within the context of the displayed GUI.

User interface facility 160 may be configured to communicate with touch screen facility 150, including receiving one or more signals representative of sensed touch input from touch screen facility 150. For example, touch screen facility 150 may sense an object touch on a touch screen and generate and provide a signal representative of the sensed object touch to user interface facility 160. Based on the sensed signal, user interface facility 160 may detect the object touch, as well as a position and/or timestamp associated with the object touch.

User interface facility 160 may be configured to perform or direct another component of system 100 to perform at least one action in response to the detected object touch. For example, in response to the detect object touch, user interface facility 160 may generate and provide data representative of one or more components of a GUI to touch screen facility 150 for display. In certain embodiments, at least one component of a GUI is generated and displayed based on the detected object touch on the touch screen. As another example, in response to a detected touch gesture, user interface facility 160 may perform an action such as selecting a selectable option or navigating within a menu of selectable options. Exemplary object touches, touch gestures, selectable options, GUI views, and GUI components are described further below.

Figure 2:
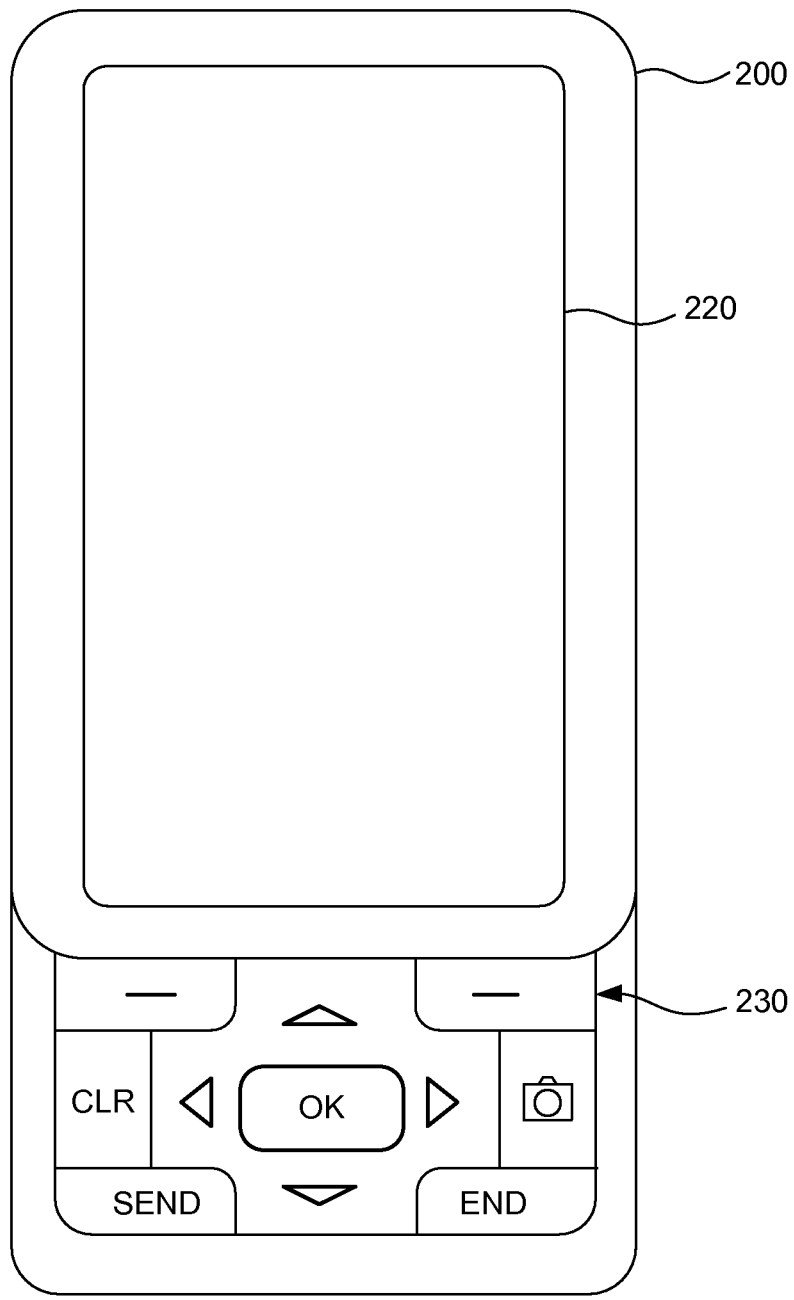
FIG. 2 illustrates an exemplary device having the system of FIG. 1 implemented therein.

System 100 may be implemented as may suit a particular application. FIG. 2 illustrates an exemplary device 200 having system 100 implemented thereon. Device 200 may include one or more of the facilities 110-160 shown in FIG. 1 and may be configured to perform one or more of the processes and/or operations described herein. Device 200 may include, but is not limited to, a mobile device (e.g., a mobile phone device), media device, handheld device, computer, gaming device, phone device (e.g., Verizon Hub device), communications device, navigation device, entertainment device, vehicular device, personal-digital assistant, digital camera, and any other device having a touch screen display. These examples are illustrative only. In other embodiments, system 100 may be implemented on other devices or types of devices.

As shown in FIG. 2, device 200 may include a touch screen 220 configured to display one or more GUIs for viewing by a user of device 200. Touch screen 220 may be included in touch screen facility 150 and may include single-touch and/or multi-touch touch screen technologies. Examples of GUIs and various GUI views that may be displayed on touch screen 220 are described in detail further below. In addition to touch screen 220, device 200 may include other input mechanisms such as one or more of the input buttons 230 shown in FIG. 2.

Figure 3B:
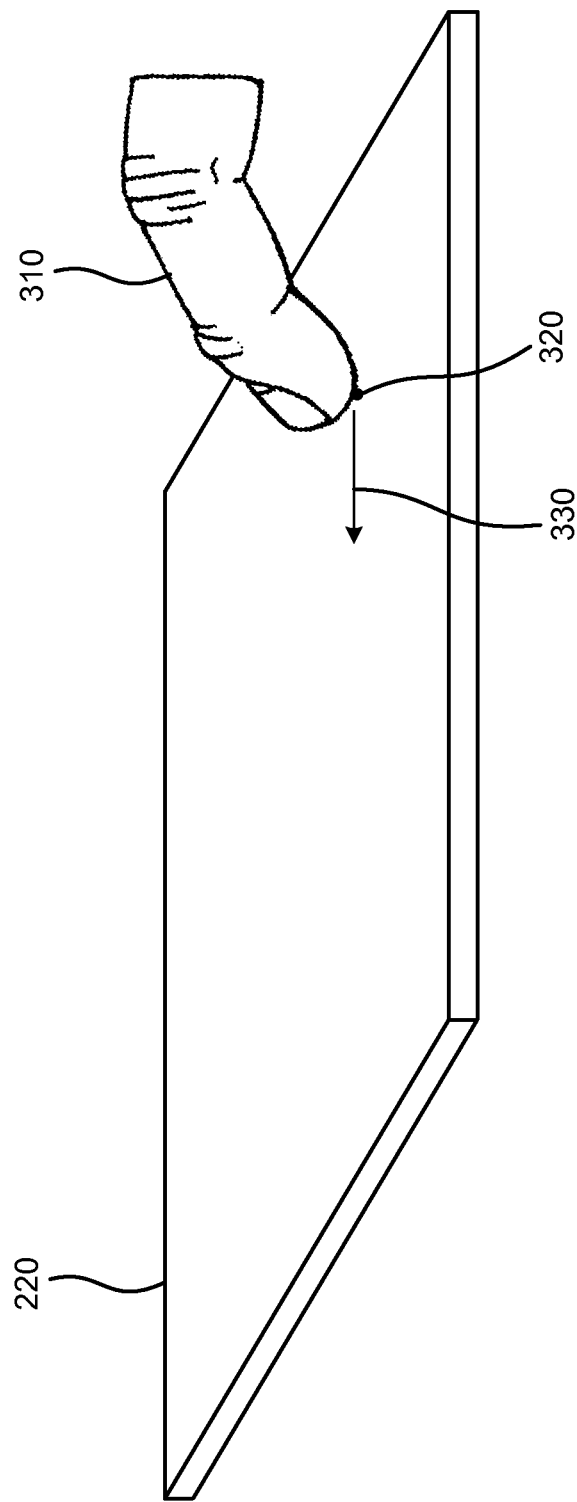
Figure 3C:
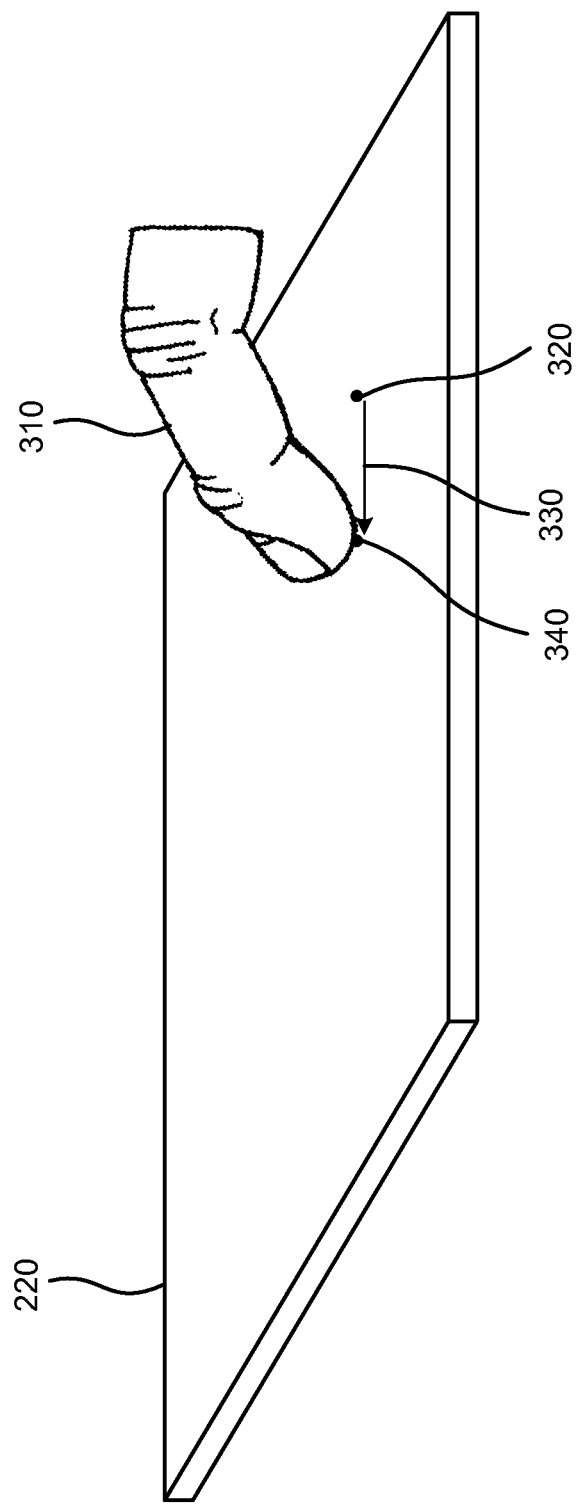

FIGS. 3A-3C illustrate perspective views of an object 310 touching a surface of the touch screen 220. While FIGS. 3A-3C show a human finger as the object 310 touching touch screen 220, this is illustrative only and not limiting in any sense. Any object that may be sensed by the touch screen 220 may be used. For example, object 310 may include a human finger or thumb, a stylus, or any other physical object that can touch and be sensed by the touch screen 220.

FIG. 3A illustrates object 310 touching a position 320 on a surface of the touch screen 220. When object 310 touches position 320 as shown, touch screen facility 150 may sense the object touch at position 320 and generate and provide at least one signal representative of the object touch at position 320 to user interface facility 160, which may process the signal to detect the object touch at position 320 and perform at least one action in response to the detected object touch, as described further below. User interface facility 160 may be configured to recognize any suitable object touch as may suit a particular implementation, including a generally stationary, temporary, and/or sustained object touch. In certain embodiments, an object touch includes a sustained, generally stationary touch of a position 320 on a touch screen 220 by an object 310.

While touching the touch screen 220, object 310 may move about on the surface (e.g., slide across the surface) of the touch screen 220. Such movement of object 310 while touching the touch screen 220 is referred to herein as a "touch gesture." A touch gesture may include any movement of object 310 from a starting position (e.g., position 320) to one or more other positions on the touch screen 220 while object 310 is touching the surface of the touch screen 220.

A touch gesture may include a movement in a particular direction. Such a touch gesture may be referred to as a "directional touch gesture." FIGS. 3B-3C illustrate an exemplary directional touch gesture including movement of object 310 beginning at position 320 and in a direction represented by arrow 330 in FIG. 3B. FIG. 3C illustrates object 310 after it has moved from position 320 to another position 340 in the direction represented by arrow 330. In other words, object 310 has moved from position 320 to position 340 by sliding on the surface of the touch screen 220 in the direction represented by arrow 330.

The example shown in FIGS. 3B-3C is just one example of a directional touch gesture. In the illustrated example, the directional touch gesture comprises a generally linear movement in a particular direction away from position 320. This is illustrative only. Other directional touch gestures may be used and recognized by user interface facility 160. For example, a directional touch gesture may include a generally linear movement of object 310 in another direction away from position 320 (e.g., any radial direction away from position 320).

A touch gesture may include one or more directional touch gestures. For example, a touch gesture may include a combination of directional touch gestures (e.g., "up," "right," and "up" directional touch gestures). A combination of directional touch gestures may form a generally non-linear touch gesture (e.g., an arc) in some examples.

Positions associated with object touches and touch gestures may be mapped to coordinates of the touch screen 220 and/or to a GUI or GUI component displayed on the touch screen 220. For example, position 320 of an object touch may be mapped to a particular section or component of a GUI displayed on the touch screen 220. Accordingly, user interface facility 160 may be configured to respond to an object touch and/or touch gesture within the context of a GUI or GUI component displayed on the touch screen 220. For example, user interface facility 160 may detect an object touch at a particular position 320, map the position 320 to a component of a displayed GUI, and select and perform one or more actions based on the position 320 and the GUI component. Examples of contextual touches and resulting actions are described further below.

To help facilitate an understanding touch screen facility 150, user interface facility 160, and the use of touch gestures on a touch screen 220, several exemplary GUI views that may be displayed on the touch screen 220 will now be described in relation to certain exemplary touch gestures.

Figure 4B:
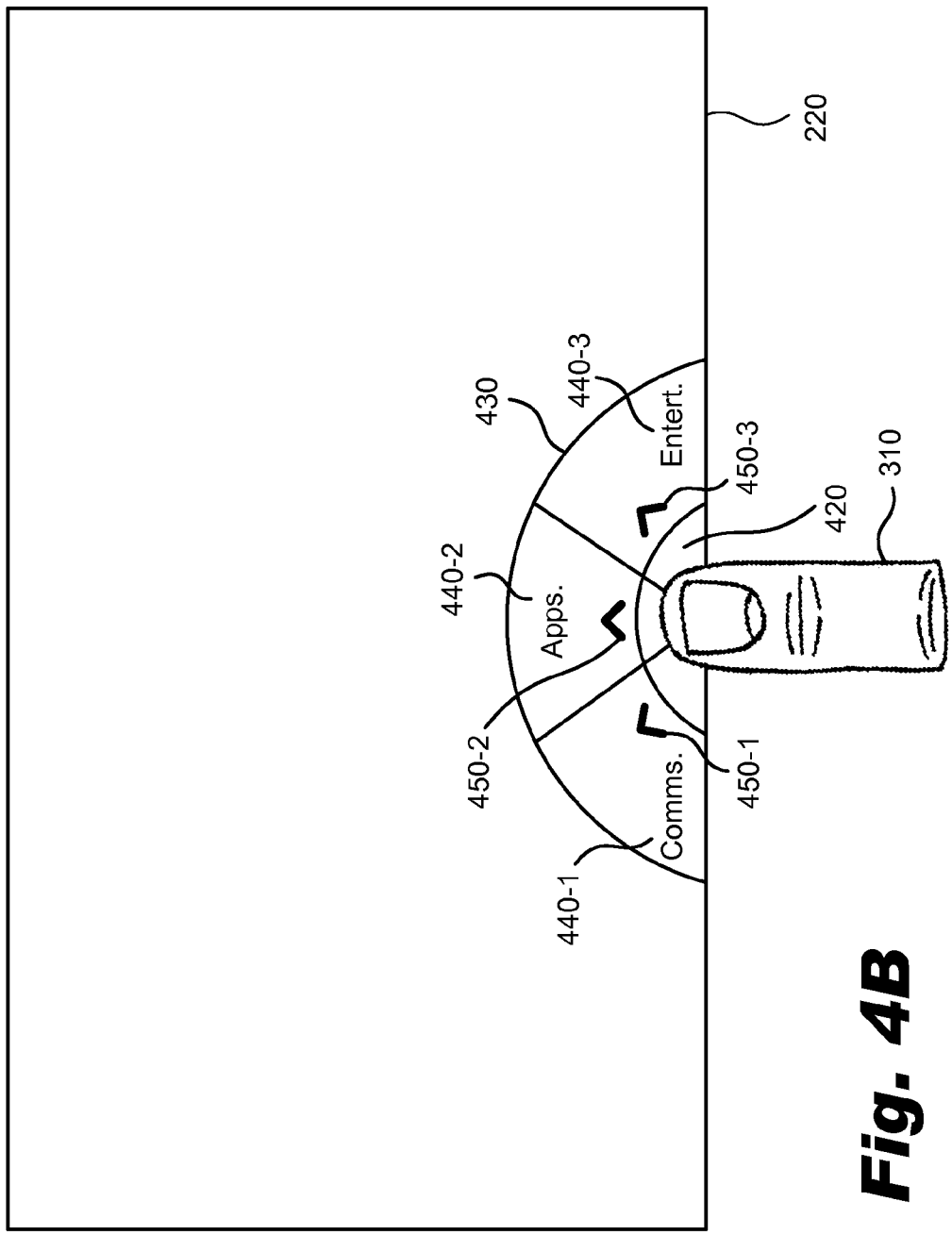
Figure 4C:
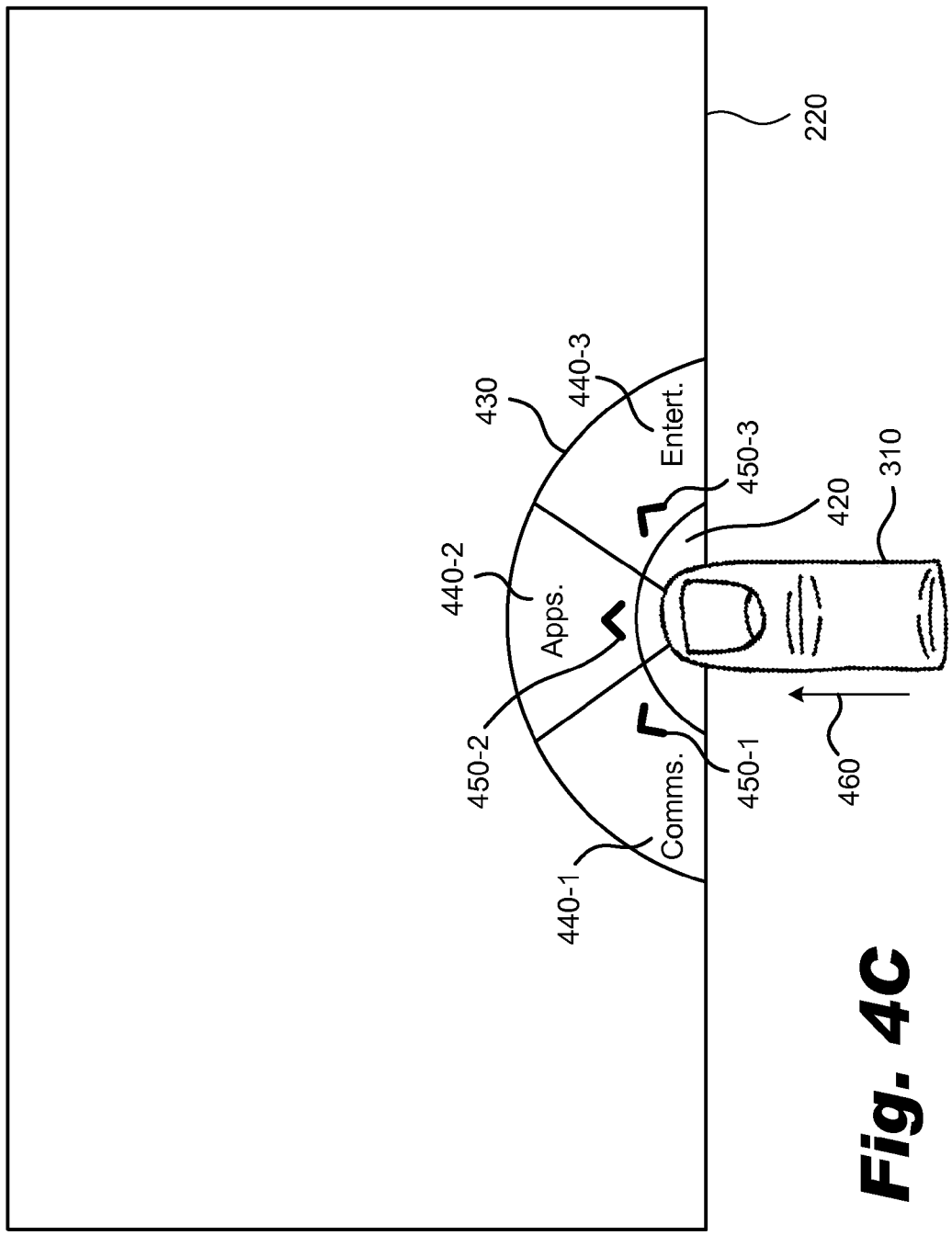

FIGS. 4A-4C illustrate exemplary views that may be displayed in a GUI on touch screen 220. The view shown in FIG. 4A includes a graphic indicating a pre-designated touch area 420 on the touch screen 220. In FIG. 4A, touch area 420 comprises an area formed by an arc and an edge of the touch screen. This example is illustrative only and not limiting in any sense. Touch area 420 may be defined as may suit a particular implementation and may include any suitable shape and/or may be located at any suitable position on the touch screen 220.

When an object 310 touches the surface of the touch screen 220 within touch area 420, the object touch may be detected as described above, and user interface facility 160 may perform an action in response to the detected object touch. For example, FIG. 4B illustrates an object 310 touching the touch screen 220 within touch area 420. In response to this object touch, user interface facility 160 may generate and provide a touch gesture interface 430 for display on the touch screen 220. Touch gesture interface 430 may be displayed in any suitable way, including as an overlay component of a GUI. The display of touch gesture interface 430 may be accompanied by one or more animation effects, including animated adding, moving, removing, or peeling away graphical layers to reveal touch gesture interface 430.

Touch gesture interface 430 may include graphics indicative of a plurality of selectable options 440 (e.g., selectable options 440-1 through 440-3 in FIG. 4B). A selectable option 440 may include any function, feature, mode, or other item that may be selected by a user. For example, in FIG. 4B, selectable options 440-1, 440-2, and 440-3 are associated with a "communications" mode, "applications" mode, and "entertainment" mode, respectively. These device operational modes are illustrative only. Other functions, features, modes, or items may be associated with selectable options 440 as may suit a particular application and/or operational context.

In certain embodiments, each selectable option 440 may be associated with a particular touch gesture that may used to select the selectable option 440. For example, FIG. 4B includes arrows 450-1, 450-2, and 450-3 representative of directional touch gestures associated with selectable options 440-1, 440-2, and 440-3, respectively. Arrow 450-1 represents a directional touch gesture away from touch area 420 in an angled direction toward an upper left corner area of touch screen 220, arrow 450-2 represents a directional touch gesture away from touch area 420 in a generally vertical direction, and arrow 450-3 represents a directional touch gesture away from touch area 420 in an angled direction toward an upper right corner area of touch screen 220.

In certain embodiments, arrows 450-1, 450-2, and 450-3 or other graphics may be displayed on the touch screen 220 to indicate directions of touch gestures associated with selectable options 440. In other embodiments, arrows 450-1, 450-2, and 450-3 or other graphics indicative of directions of touch gestures associated with selectable options 440 may be omitted and positioning of graphics representative of selectable options 440 may be relied upon to indicate directions of touch gestures associated with the selectable options 440.

When object 310 moves from a position within touch area 420 and in a direction of any of the arrows 450-1, 450-2, and 450-3 while maintaining contact with the touch screen 220, user interface facility 160 may detect the directional touch gesture and select one of the selectable options 440-1, 440-2, and 440-3 corresponding to the directional touch gesture. For example, while touching the touch screen 220, object 310 may move in a generally vertical direction away from a position within touch area 420, as illustrated by arrow 460 in FIG. 4C. User interface facility 160 may detect the movement on the touch screen 220 as a generally vertical directional touch gesture. In response to the detected touch gesture, user interface facility 160 may perform an action associated with the touch gesture. For example, user interface facility 160 may select the selectable option 440-2 (e.g., an "applications" mode) associated with the directional touch gesture. Selection of selectable option 440-2 may launch an "applications" mode or any other function, feature, mode, or item associated with the detected touch gesture. In similar manner, a detected touch gesture in another direction may cause user interface facility 160 to select another of the selectable options 440 shown in FIG. 4C.

The configuration (e.g., shape) of touch gesture interface 430 and/or the positioning of graphics representative of selectable options 440 displayed on the touch screen 220 may be configured to be conducive to the respective touch gestures associated with the selectable options 440. For example, a graphic representative of selectable option 440-2 may be displayed at a position that is generally vertical from touch area 420 as shown in FIG. 4C. Accordingly, a directional touch gesture associated with selectable option 440-2 may include movement of object 310 toward the graphic representative of the selectable option 440-2.

The shape and placement of the touch gesture interface 430 and/or the positioning of graphics representative of selectable options 440 within the touch gesture interface 430 may be configured to be conducive to certain touch gestures convenient to a particular object 310 or type of object 310. For example, placement of graphics representative of selectable options 440 radially about touch area 420 or about a position 320 of an object touch may be conducive to the use of various directional touch gestures to select respective selectable options 440. For instance, a human index finger or thumb may be slid on touch screen 220 from a position within touch area 420 in one of a plurality of different directions on the touch screen 220 to select from a plurality of selectable options 440.

Figure 5B:
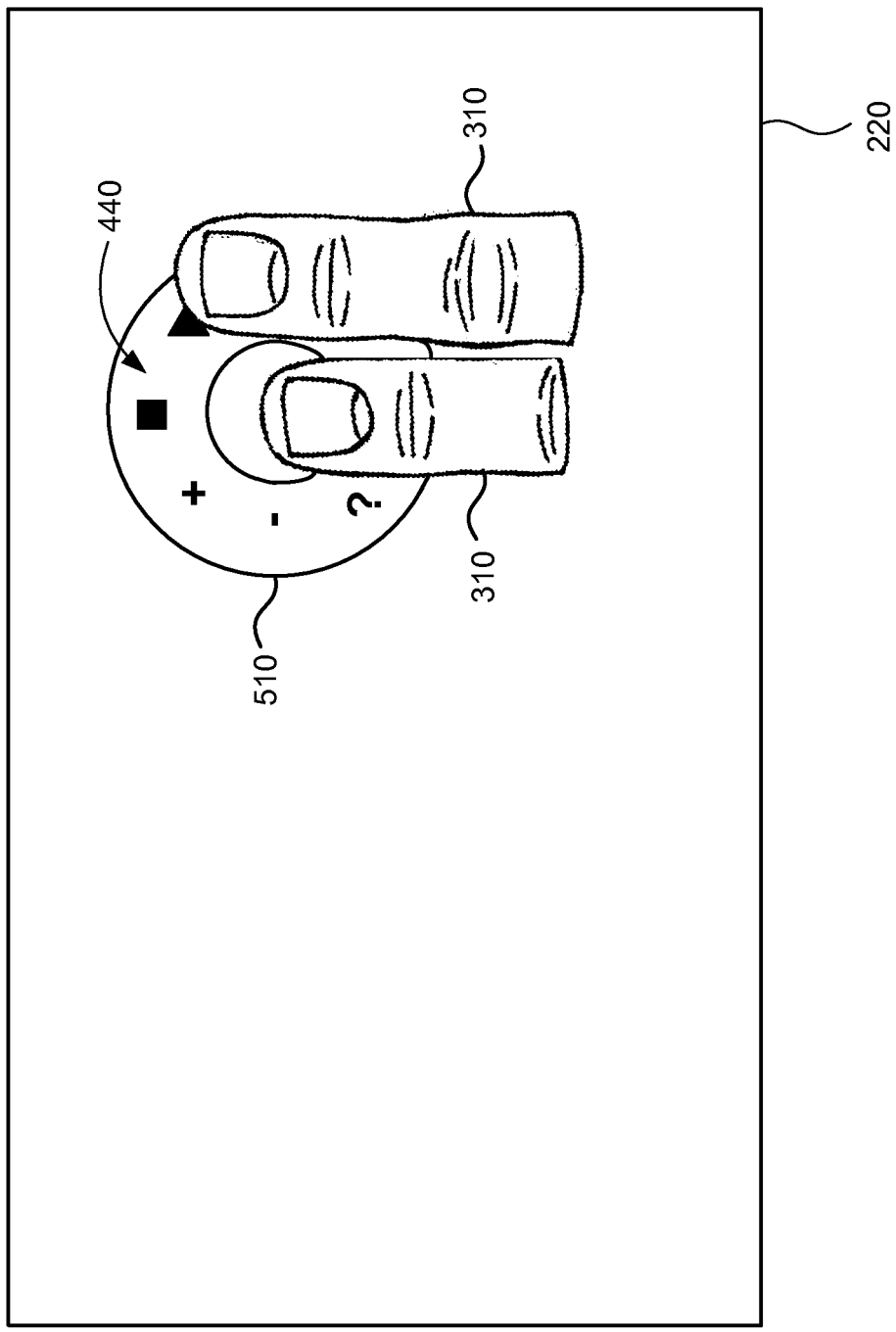
Figure 5C:
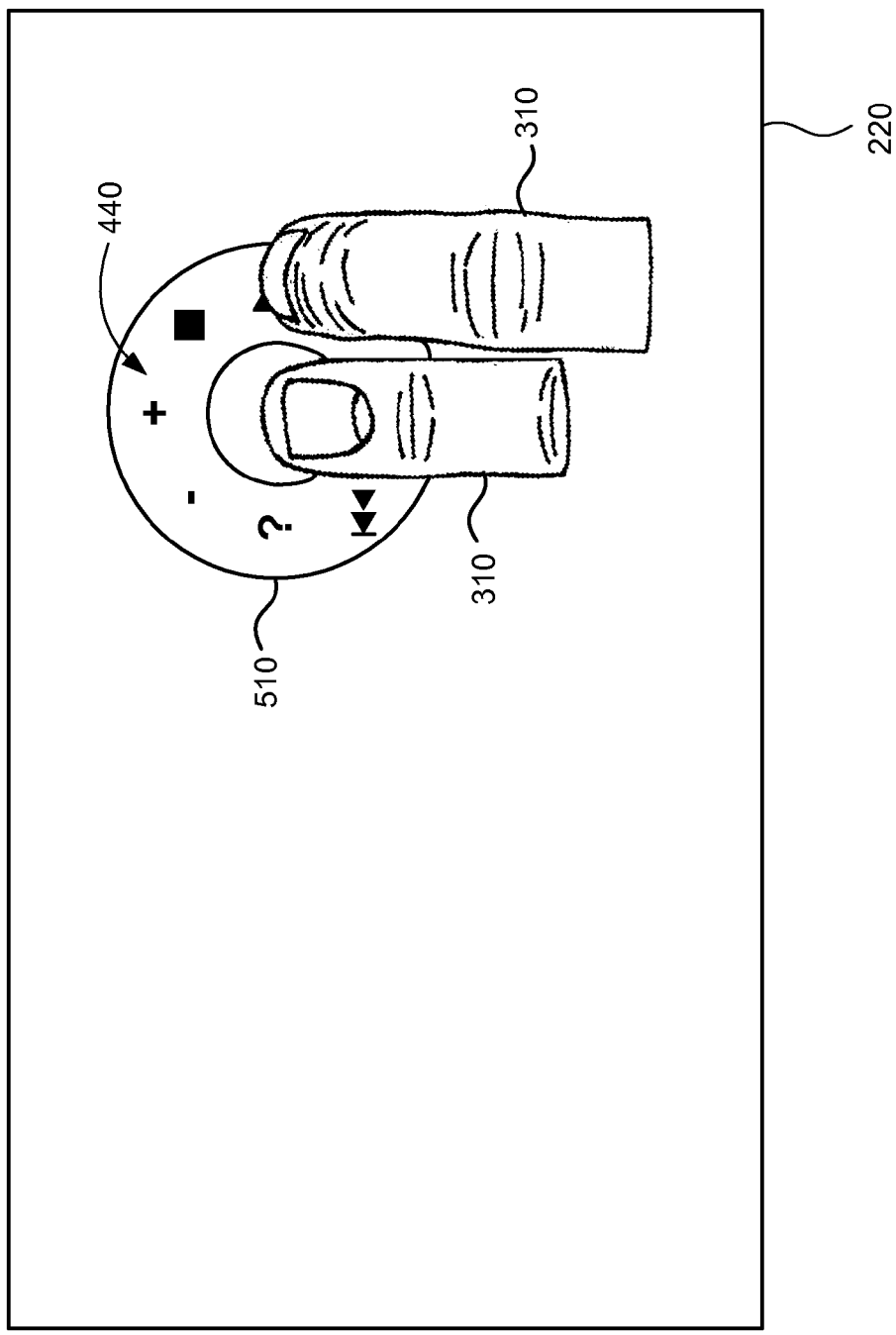

The shape, configuration, and placement of touch gesture interface 430 in FIGS. 4B-4C are illustrative only. Other touch gesture interfaces 430 of different shapes, configurations, and placements, and having various selectable objects 440 included therein, may be used in other embodiments. For example, FIGS. 5A-5C show other exemplary views that may be displayed in a GUI on touch screen 220. FIG. 5A illustrates another exemplary touch gesture interface 510 that may be displayed on touch screen 220 in response to a detected object touch. When an object 310 touches a position on the touch screen 220, user interface facility 160 may detect the object touch and generate and provide data representative of touch gesture interface 510 for display on the touch screen 220 as shown in FIG. 5A.

As shown in FIG. 5A, touch gesture interface 510 may be generally circular in shape and may include graphics representative of a plurality of selectable options 440 positioned within touch gesture interface 510 and about a position of an object touch in a generally circular shape. In FIG. 5A, the selectable options 440 are associated with functions of a media player application, including functions for stopping, playing, pausing, skipping forward, skipping backward (hidden by object 310 in FIG. 5A), decreasing volume, and increasing volume in association with media content. The selectable options 440 may be associated with additional or alternative functions, such as a help function ("?") shown in FIG. 5A.

In certain embodiments, each of the selectable objects 440 in touch gesture interface 510 may be associated with a particular touch gesture such as a directional touch gesture in a certain radial direction away from the position of the object touch that caused touch gesture interface 510 to be displayed. For example, while maintaining contact with the surface of the touch screen 220, object 310 may be moved in an upward, generally vertical direction away from the position of the object touch in order to cause user interface facility 160 to select a "stop" function represented by a square-shaped selectable option graphic positioned as shown in FIG. 5A. As an alternative example, object 310 may be moved in a sideways, generally horizontal direction to the right of the position of the object touch in order to cause user interface facility 160 to select a "pause" function represented by a selectable option graphic having two vertical parallel lines positioned as shown in FIG. 5A. Similarly, object 310 may move in another radial direction away from the position of the object touch to cause a selection of another selectable option 440 included in touch gesture interface 510.

In certain other embodiments, rather than associating a different touch gesture (e.g., touch gestures in different radial directions away from an object touch position) with each selectable option 440 in touch gesture interface 510, certain touch gestures may be associated with one or more specific actions that may be performed in response to detection of the touch gestures. For example, a touch gesture including an upward, generally vertical movement of object 310 away from the position of the object touch may be associated with a selection action. Accordingly, when such a touch gesture is detected, user interface facility 160 may select a selectable option 440 located above the position of the object touch in the touch gesture interface 510 (e.g., a "stop" function in FIG. 5A).

In certain embodiments, one or more other touch gestures may be associated with one or more navigational actions. An exemplary navigational action may include causing touch gesture interface 510 and/or graphics representative of selectable options 440 in the touch gesture interface 510 to rotate about the position of an object touch such that different ones of the graphics representative of the selectable options 440 may be moved into and out of a selectable position located above the position of the object touch. As an example, while object 310 continues to touch the touch screen at the object touch position, another object 310 may be used to perform a touch gesture configured to cause touch gesture interface 510 and/or graphics representative of selectable options 440 in the touch gesture interface 510 to rotate.

FIG. 5B illustrates another object 310 (e.g., a middle finger) ready to perform a touch gesture configured to cause touch gesture interface 510 and/or graphics representative of selectable options 440 in the touch gesture interface 510 to rotate. For instance, the other object 310 may move from one position within the touch gesture interface 510 to another position within the touch gesture interface 510 to cause the touch gesture interface 510 to rotate in the direction of movement. If the other object 310 shown in FIG. 5B moves in a generally downward direction from the position shown in FIG. 5B, for example, user interface facility 160 may detect the touch gesture of the other object 310 and cause touch gesture interface 510 and/or graphics representative of selectable objects 440 in the touch gesture interface 510 to rotate clockwise based on the generally downward direction of the object movement. Alternatively, if the other object 310 shown in FIG. 5B moves in a generally upward direction from the position shown in FIG. 5B, user interface facility 160 may detect the touch gesture of the other object 310 and cause touch gesture interface 510 and/or graphics representative of selectable objects 440 in the touch gesture interface 510 to rotate counter-clockwise based on the generally upward direction of the object movement.

In this or similar manner, selectable options 440 may be rotated about the position of the object touch until a desired selectable option 440 is located at a selection position (e.g., directly above the position of the object touch). The first object 310 (e.g., an index finger) may then move in a generally upward direction to perform an upwardly directed touch gesture, and user interface facility 160 may detect the touch gesture and perform an action of selecting the selectable object 440 located above the position of the object touch. FIG. 5C illustrates a position of the other object 310 after moving in a generally downward direction from the position of the other object 310 shown in FIG. 5B. As shown in FIG. 5C, the selectable options 440 in the touch gesture interface 530 have been rotated clockwise based on the downwardly directed touch gesture of the other object 310. A selectable option 440 associated with an "increase volume" function is now located above the position of the object touch. With the desired selectable option 440 located above the position of the object touch, the first object 310 may move in a generally vertical direction to produce a directional touch gesture configured to cause the selectable object 440 above the object touch to be selected.

Figure 6A:
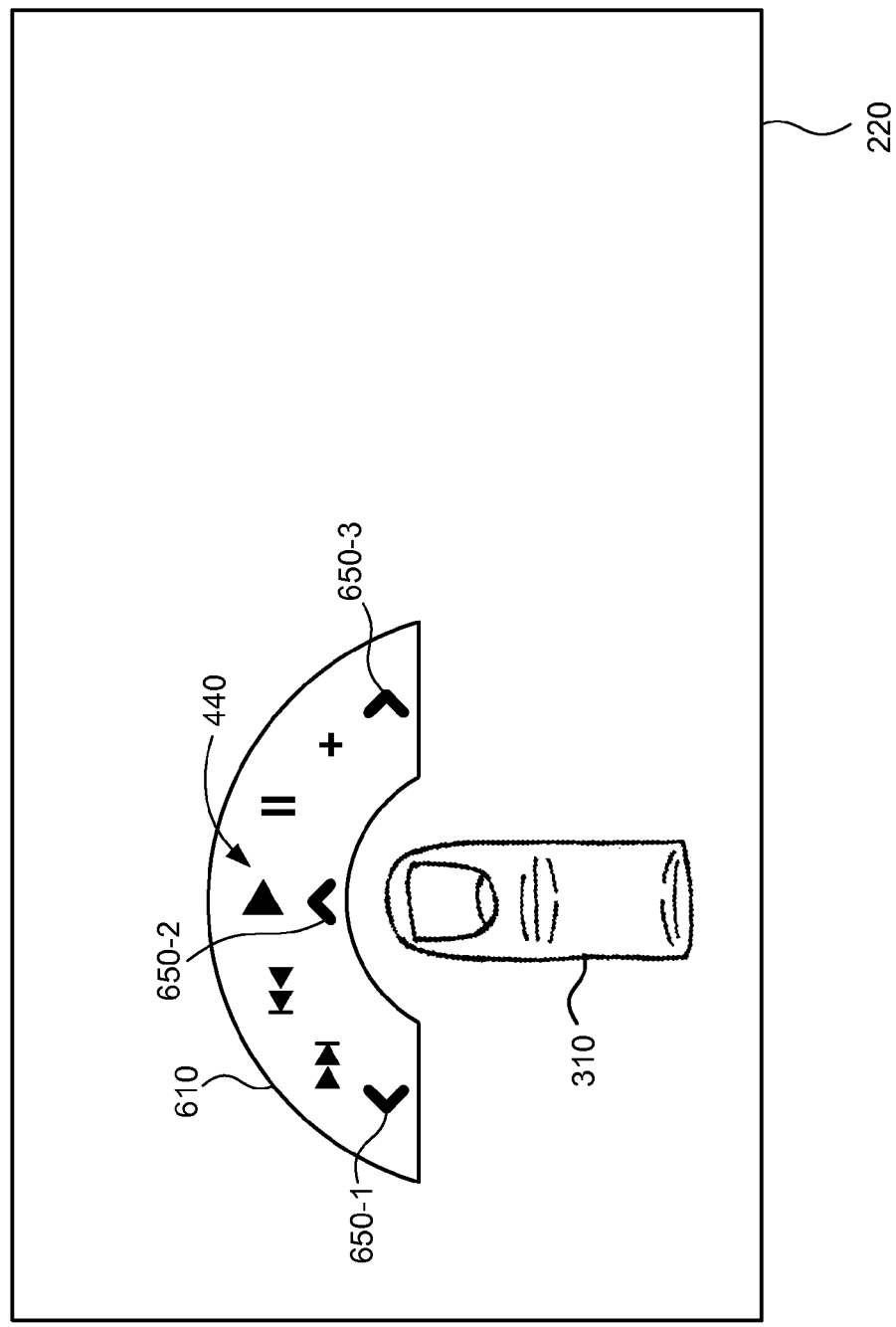
FIGS. 6A-6C illustrate further exemplary views within a graphical user interface displayed on a touch screen display.
Figure 6B:
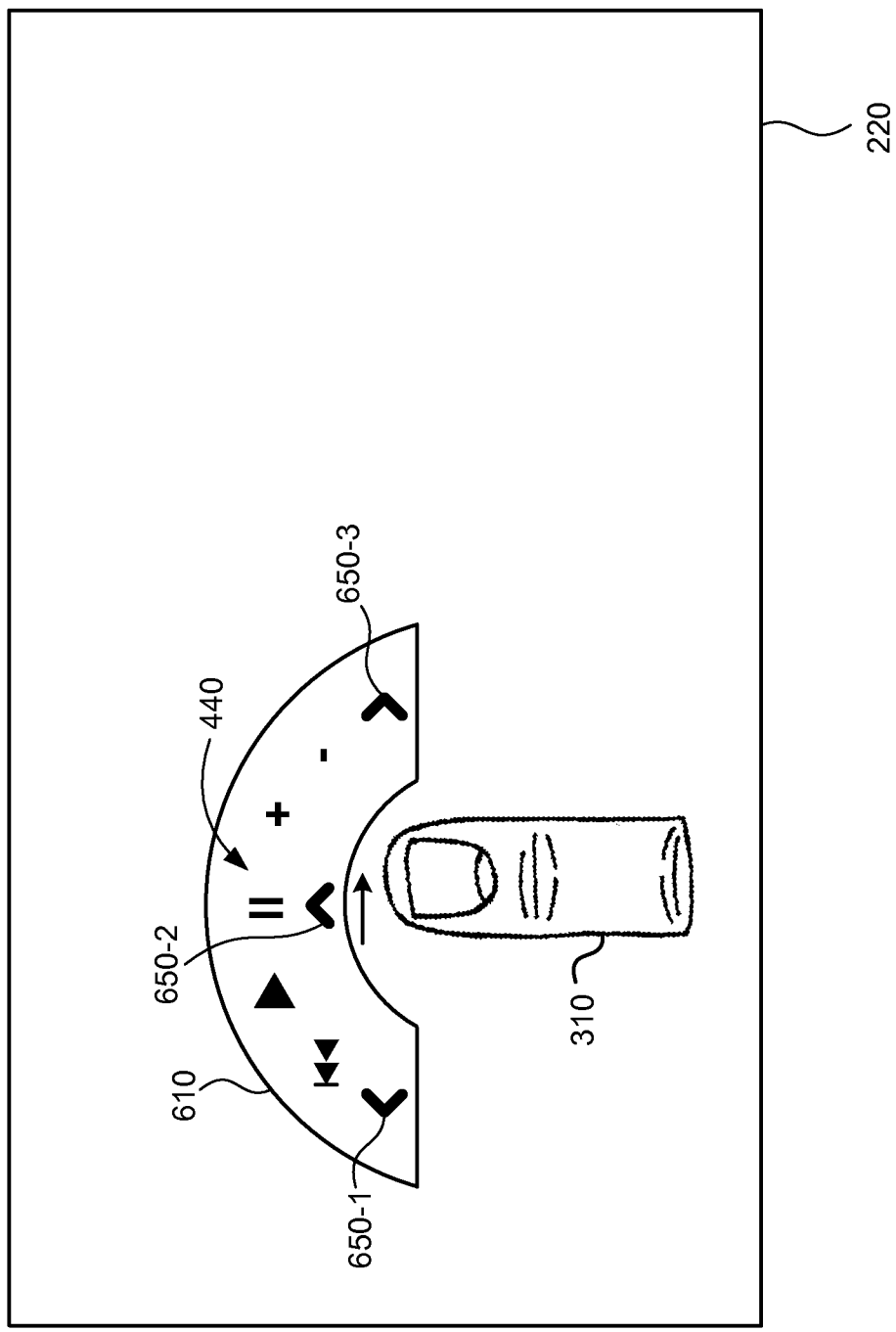
Figure 6C:
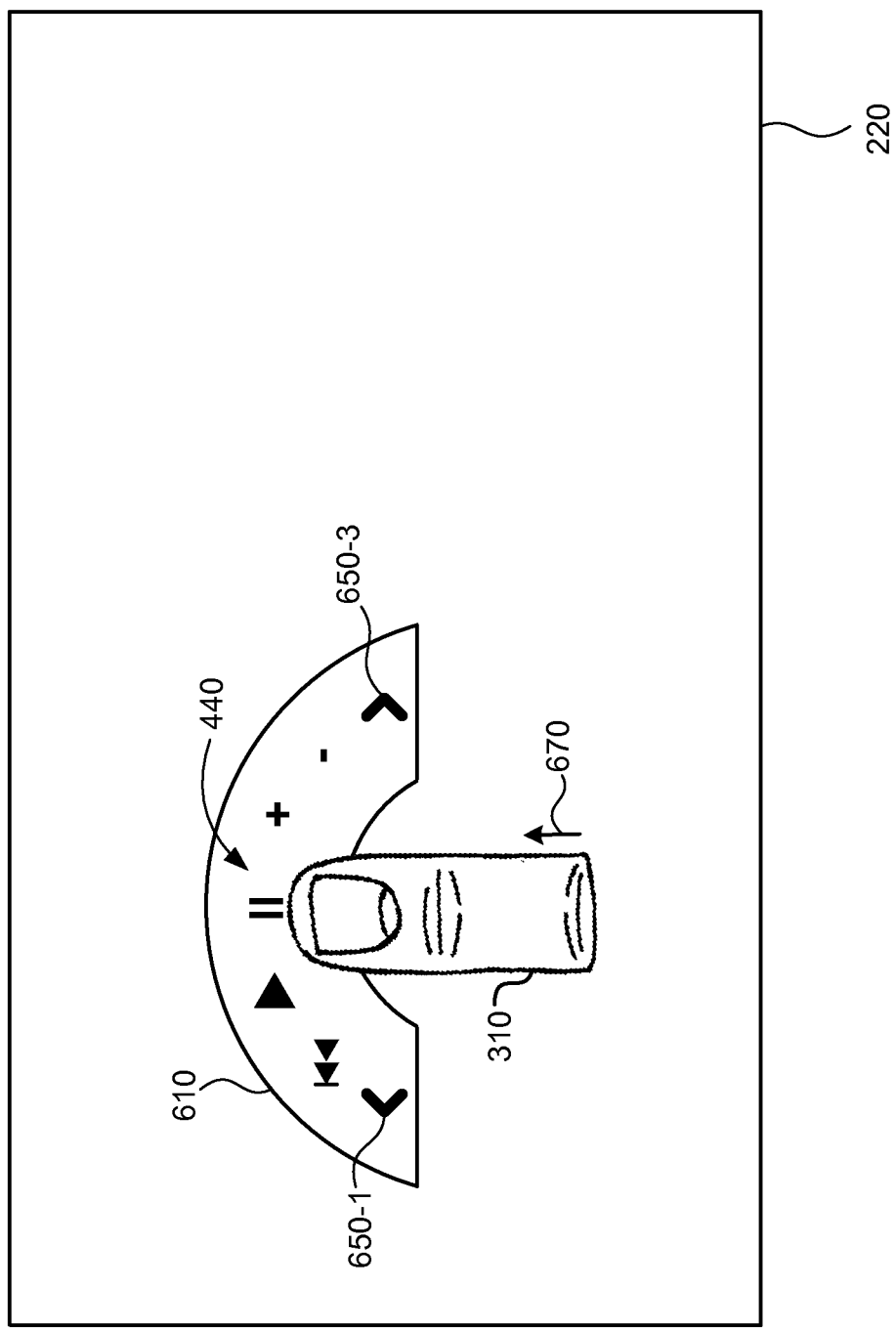

While touch gesture interface 510 may be generally circular in shape as shown in FIGS. 5A-5C, other configurations of touch gesture interfaces and selectable options 440 may be used in other embodiments. For example, FIGS. 6A-6C illustrate another exemplary touch gesture interface 610 having graphics representative of selectable options 440 included therein and that may be displayed in response to detecting object 310 touching a position on the touch screen 220. As shown in FIG. 6A, touch gesture interface 610 may form an arc or partially circular shape about a position touched by object 310. This is illustrative only. Touch gesture interface 610 may form other shapes (e.g., a linear or circular shape) in other embodiments.

In relation to touch gesture interface 610, certain touch gestures may be associated with certain actions. For example, a generally upward touch gesture performed by object 310 may be associated with an action of selecting the selectable option 440 located vertically above the initial position of the object touch, and generally horizontal touch gestures performed by object 310 may be associated with navigational actions. For instance, a generally horizontal touch gesture to the right of the position of the object touch may be associated with an action of rotating selectable options 440 counter-clockwise through the touch gesture interface 610, and a generally horizontal touch gesture to the left of the position of the object touch may be associated with an action of rotating the selectable options 440 clockwise through the touch gesture interface 610. Accordingly, generally horizontal touch gestures may be used to move (e.g., scroll) selectable options 440 into and out of the touch gesture interface 610 and/or into and out of a selectable position within the touch gesture interface 610.

FIG. 6A includes arrows 650-1, 650-2, and 650-3 indicative of directional touch gestures associated with touch gesture interface 610. Arrow 650-1 represents a generally horizontal touch gesture to the left of the initial position of the object touch, arrow 650-2 represents a generally vertical touch gesture upward of the initial position of the object touch, and arrow 650-3 represents a generally horizontal touch gesture to the right of the initial position of the object touch.

In certain embodiments, arrows 650-1, 650-2, and 650-3 or other graphics may be displayed on the touch screen 220 to indicate directions of touch gestures associated with selectable options 440 included in touch gesture interface 610. In other embodiments, arrows 650-1, 650-2, and 650-3 or other graphics indicative of directions of touch gestures associated with selectable options 440 included in touch gesture interface 610 may be omitted.

FIG. 6B illustrates object 310 performing a generally horizontal touch gesture to the right of the initial position of an object touch, as represented by arrow 660. User interface facility 160 may detect the touch gesture and respond by causing selectable options 440 to scroll through touch gesture interface 610 in a counter-clockwise direction. Hence, certain selectable options 440 may be displayed in the touch gesture interface 610 on the touch screen 220, other selectable options 440 associated with the touch gesture interface 610 may be off screen, and the selectable options 440 may be scrolled on and off screen.

The scrolling may be performed in any suitable way. In certain embodiments, for example, scrolling may be performed when object 310 performs a corresponding touch gesture and/or when object 310 is held at an end position of the touch gesture. In certain embodiments, a speed at which selectable options 440 are scrolled through touch gesture interface 610 may be based on a distance of a touch gesture. For example, if object 310 moves a short distance to the right of the initial object touch position, selectable options 440 may be scrolled at a slow speed. If object 310 moves a greater distance to the right of the initial object touch position, selectable options 440 may be scrolled at a faster speed. Scrolling may be stopped in any suitable way, including in response to object 310 returning to the initial object touch position. Thus, touch gestures may be performed until a desired selectable object 440 is located in a selection position and ready for selection.

FIG. 6C illustrates object 310 performing a generally upward touch gesture to select the selectable option 440 located above the position of the object touch, as represented by arrow 670. In the example shown in FIG. 6C, the selectable option 440 located above the position of the object touch is associated with a "pause" function. In response to detection of the generally upward touch gesture, the selectable option 440 may be selected and the associated "pause" function performed.

While several exemplary configurations of touch gesture interfaces, selectable options 440, touch gestures, and actions have been described above, the examples are not limiting. Other configurations and examples of touch gesture interfaces, selectable options 440, touch gestures, and/or actions may be implemented in other embodiments. For example, other shapes of touch gesture interfaces such as generally linear shaped touch gesture interfaces, including horizontally, vertically, or diagonally oriented touch gesture interfaces may be employed. Such touch gesture interfaces may be configured to operate similarly to any of the touch gesture interfaces described above.

One or more actions performed by user interface facility 160 in response to an object touch and/or touch gesture may be contextually selected. For example, when an object touch or touch gesture is detected on the touch screen 220, user interface facility 160 may select, adapt, and/or perform one or more actions based at least in part on a context within which the object touch or touch gesture is detected. The context may include and/or be determined based on one or more factors, including, but not limited to, a location of an object touch or touch gesture on the touch screen 220, an application, mode, feature, service, or process running when the object touch or touch gesture is detected, a GUI displayed on the touch screen 220, a location of an object touch or touch gesture relative to a particular graphic (e.g., an icon, GUI, or GUI component) displayed on the touch screen 220, and any other factor indicative of an operational and/or positional context.

For instance, when an object touch is detected on touch screen 220, user interface facility 160 may select and provide a particular touch gesture interface and/or set of selectable options 440 for display based at least in part on a context within which the object touch is detected. As an example, if a media player application is running when the object touch is detected, user interface facility 160 may select and provide a particular touch gesture interface and/or set of selectable options 440 associated with the media player application for display based at least in part of the media player context. The selectable options 440 may be selected to include or otherwise be associated with functions of the media player application (e.g., play, record, stop, pause, etc.).

As another example, an object touch may be detected at a position on or proximate to a particular graphic displayed on the touch screen 220. The graphic may be representative of and/or associated with a particular application, file, or file type. In response to the object touch, user interface facility 160 may select and provide a particular touch gesture interface and/or set of selectable options 440 associated with the particular application, file, or file type. For instance, the graphic may be associated with a media type file (e.g., an audio file), and user interface facility 160 may select and provide an touch gesture interface and/or selectable options 440 including or otherwise associated with functions that may be used to process the media type file.

As yet another example, an object touch may be detected within a context of a menu application. In response, user interface facility 160 may select and provide for display a particular touch gesture interface and/or selectable options 440 including or otherwise associated with functions of the menu application. In this or similar manner, a touch gesture interface and/or selectable options 440 may be selected and displayed based at least in part on a context of a detected object touch.

Similarly, one or more actions may be selected and performed in response to a detected touch gesture and based at least in part on a context of the touch gesture. Accordingly, a touch gesture may be associated with a particular action in one context, and the same touch gesture may be associated with another action in another context. For instance, the same touch gesture may be associated with different actions in the contexts of different touch gesture interfaces. In the context of one touch gesture interface, for example, a touch gesture may be associated with an object selection action, and in the context of another touch gesture interface, the same touch gesture may be associated with a menu navigation action (e.g., scrolling). Hence, touch gestures interfaces and/or selectable options 440 included therein may be adapted based on a context of a detected object touch or touch gesture.

User interface facility 160 may be configured to interact with application facility 140. This may be helpful for selecting and performing one or more actions based at least in part on context of an application running on a device 200, as described above. In certain embodiments, for example, user interface facility 160 may communicate with an application within application facility 140 to determine functions of the application to be associated with one or more selectable options 440 to be included in a touch gesture interface.

As an example, user interface facility 160 may be configured to interact with a menu application running on a device 200. The menu application may provide multiple layers or levels of menus and menu options and may allow a user of device 220 to provide input to direct ingress and/or egress to/from the different menu layers. Hence, a user may ingress or drill down through several menu layers to find and select a desired menu option. In certain embodiments, user interface facility 160 may be configured to interact with the menu application in order to associate one or more touch gestures, touch gesture interfaces, and/or selectable options 440 within touch gesture interfaces with navigation within and/or selection of one or more layers of menu options provided by the menu application. Accordingly, a touch gesture interface may include multiple layers of selectable options 440 associated with layers of menu options, and touch gestures may be used for ingress and egress to/from layers of a menu application.

Figure 7A:
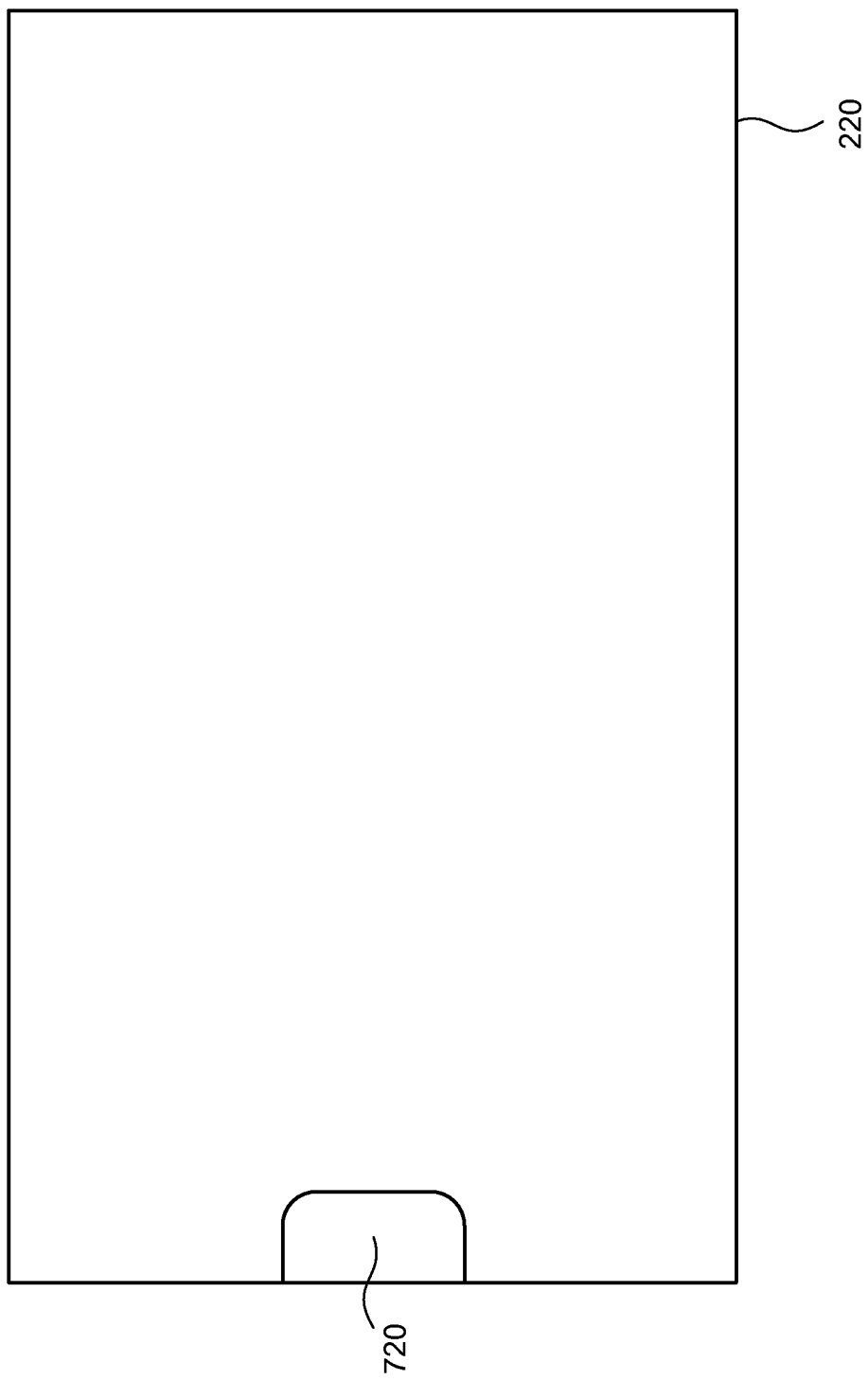

To help facilitate an understanding of user interface facility 160 interacting with a menu application, FIGS. 7A-7C illustrate exemplary menu application views within a GUI displayed on touch screen 220. In FIG. 7A, the GUI includes a menu launch tab 720. FIG. 7B illustrates object 310 touching a position within menu launch tab 720. In response to the object touch, a touch gesture interface 730 including a set of selectable options 440 may be displayed in the GUI as shown in FIG. 7B. In relation to touch gesture interface 730, user interface facility 160 may associate touch gestures with actions. For example, generally downward and upward touch gestures may be associated with actions of vertically scrolling selectable options 440 through the touch gesture interface 730, and a generally horizontal touch gesture directed away from and to the right of the position of the object touch may be associated with an action of selecting one of the selectable options 440 located horizontally right of the menu launch tab 720.

When object 310 performs a generally horizontal touch gesture to the right of menu launch tab 720 as shown FIG. 7C, the selectable option 440 (e.g., an "entertainment" option) located horizontally right of the menu launch tab 720 is selected. In response to the selection, another touch gesture interface 740 including another set of selectable options 440 may be displayed as shown in FIG. 7C. Touch gesture interface 740 may be a sub-layer of touch gesture interface 730, and selectable options 440 within touch gesture interface 740 may be a subset of a selected one of the selectable options within touch gesture interface 730. For example, if the selected option 440 is an "entertainment" option, the selectable options 440 included in touch gesture interface 740 may include entertainment related options such as the "games," "music," and "videos" options as shown in FIG. 7C. In this or similar manner, a user may use object touches and/or touch gestures to navigate within menu layers and/or menu options of a menu application, including drilling down into menu layers and menu sub-layers to locate a desired menu option.

A user may additionally or alternatively use object touches and/or touch gestures to preview menu layers and/or menu options of a menu application, without having to leave a current menu layer or operational state. For example, when object 310 touches menu launch pad 720, touch gesture interface 730 may be displayed and provide a preview of selectable options 440 without leaving the current operational state of device 200.

While exemplary touch gesture interfaces 730 and 740, touch gestures, and resultant actions have been described in the above example of use interface facility 160 interacting with a menu application, the example is illustrative only. Other touch gesture interfaces, touch gestures, and/or resultant actions may be used in association with a menu application or another application in other embodiments.

As another example of user interface facility 160 interacting with a menu application, FIG. 8 illustrates an exemplary menu application view within a GUI displayed on touch screen 220. FIG. 8 also illustrates an exemplary path 810 made up of directional touch gestures used to navigate through multiple touch gesture interfaces 820, 830, and 840. As shown, path 810 may include a first directional touch gesture from touch area 420 to touch gesture interface 820, a second directional touch gesture from touch gesture interface 820 to touch gesture interface 830, and a third directional touch gesture from touch gesture interface 830 to touch gesture interface 840. In response to the first directional touch gesture, user interface facility 160 may select an "entertainment" selectable object 440 and provide touch gesture interface 830 for display on touch screen 220. In response to the second directional touch gesture, user interface facility 160 may select a "music" selectable object 440 and provide touch gesture interface 840 for display on touch screen 220. In response to the third directional touch gesture, user interface facility 160 may select a particular "album" selectable object 440 and optionally provide another touch gesture interface (not shown) for display on touch screen 220. In this or similar manner, object 310 may move so as to create a path 810 of directional touch gestures configured to navigate through touch gesture interfaces to locate a desired selectable option 440. In certain embodiments, a selection of a located selectable option 440 may be performed when object 310 is removed from and is no longer touching a graphic associated with the selectable option 440.

In certain embodiments, user interface facility 160 may be configured to generate one or more touch gesture shortcuts. A touch gesture shortcut may include an association between a touch gesture and one or more actions to be performed in response to the touch gesture being detected. After a touch gesture shortcut is generated, detection of the touch gesture associated with the shortcut may initiate performance of one or more actions associated with the shortcut. This may be accomplished without displaying a touch gesture interface on the touch screen 220. Shortcuts may be defined contextually such that a touch gesture detected within a predefined context may launch one or more actions associated with the shortcut.

A touch gesture shortcut may be associated with a single touch gesture, a single directional touch gesture, a combination of touch gestures, or a combination of directional touch gestures. For example, path 810 made up of multiple directional touch gestures may be associated with a shortcut for causing a particular album to be selected. Thus, when the directional touch gestures are performed in the combination shown in FIG. 8, the particular album may be selected. As another example, a single directional touch gesture may be associated with a shortcut for causing a particular mode to be selected. Thus, when the directional touch gesture is performed, the particular mode may be selected.

In certain examples, a shortcut may be automatically learned and generated over time. For example, user interface facility 160 may be configured to track and record touch gestures, and to automatically generate shortcuts based on the tracked touch gestures. For instance, user interface facility 160 may include a shortcut definition heuristic specifying one or more conditions to be satisfied in order to generate a shortcut. Examples of such conditions may include, but are not limited to, history of touch gestures performed, context in which the touch gestures are performed, actions performed in response to the touch gestures, and distinctness of touch gestures (e.g., whether a touch gesture is used for one action or multiple actions). Accordingly, shortcuts may be learned and created over time based on tracked touch gestures.

In certain examples, a shortcut may be defined by a user. User interface facility 160 may be configured to provide at least one tool configured to enable a user to define a shortcut. Such a tool may be configured to request and/or record a particular touch gesture, request identification of one or more actions to be associated with the touch gesture, and associate the touch gesture with the action(s) as a shortcut. Subsequently, detection of the touch gesture may cause the action(s) to be performed.

The tool may be configured to enable a user to combine various touch gestures together to define a shortcut. Accordingly, a shortcut may be associated with a particular combination of touch gestures to be performed to invoke the shortcut.

In certain embodiments, user interface facility 160 may be configured to provide at least one tool configured to enable a user to create a script of one or more actions. User interface facility 160 may be configured to generate a script based on user input. The script may be configured to cause the one or more actions to be performed. The one or more actions may include any operation that may be performed by system 100 and/or device 200. For example, the actions may include communications actions that may be performed by communication facility 110 to communicate with a device external to system 100. In certain embodiments, for example, the actions may relate to external phone and/or data communications (e.g., wireless phone and/or data communications). Of course, a script may include other exemplary actions, such as data processing actions, for example.

User interface facility 160 may be configured to provide at least one tool configured to enable a user to define an association between a script and a touch gesture. The association may be in the form of a touch gesture shortcut to the script. Accordingly, when the touch gesture is detected, the associated script may be launched and the related actions executed.

As an example, a user may define a script to include actions for publishing electronic media content to one or more platforms (e.g., a social networking webpage). The user may define a shortcut associating the script with a particular touch gesture. Subsequently, the user may perform the touch gesture to invoke the shortcut and associated script of publishing actions. For example, the user may select one or more media content files and perform the touch gesture. User interface facility 160 may detect the touch gesture and invoke the shortcut and associated script of publishing actions. The actions may be executed to publish the media content file(s) to the designated platforms.

A touch gesture interface may include or otherwise be associated with certain touch gesture features, modes, or functions. For example, a touch gesture interface may include a selectable option 440 that may be selected to invoke a particular touch gesture feature, mode, or function. As an example, a selectable option 440 in a touch gesture interface may be associated with a batch processing mode. When the selectable option 440 is selected, the batch processing mode may be launched and the touch gesture interface may operate in the batch processing mode.

Figure 9:
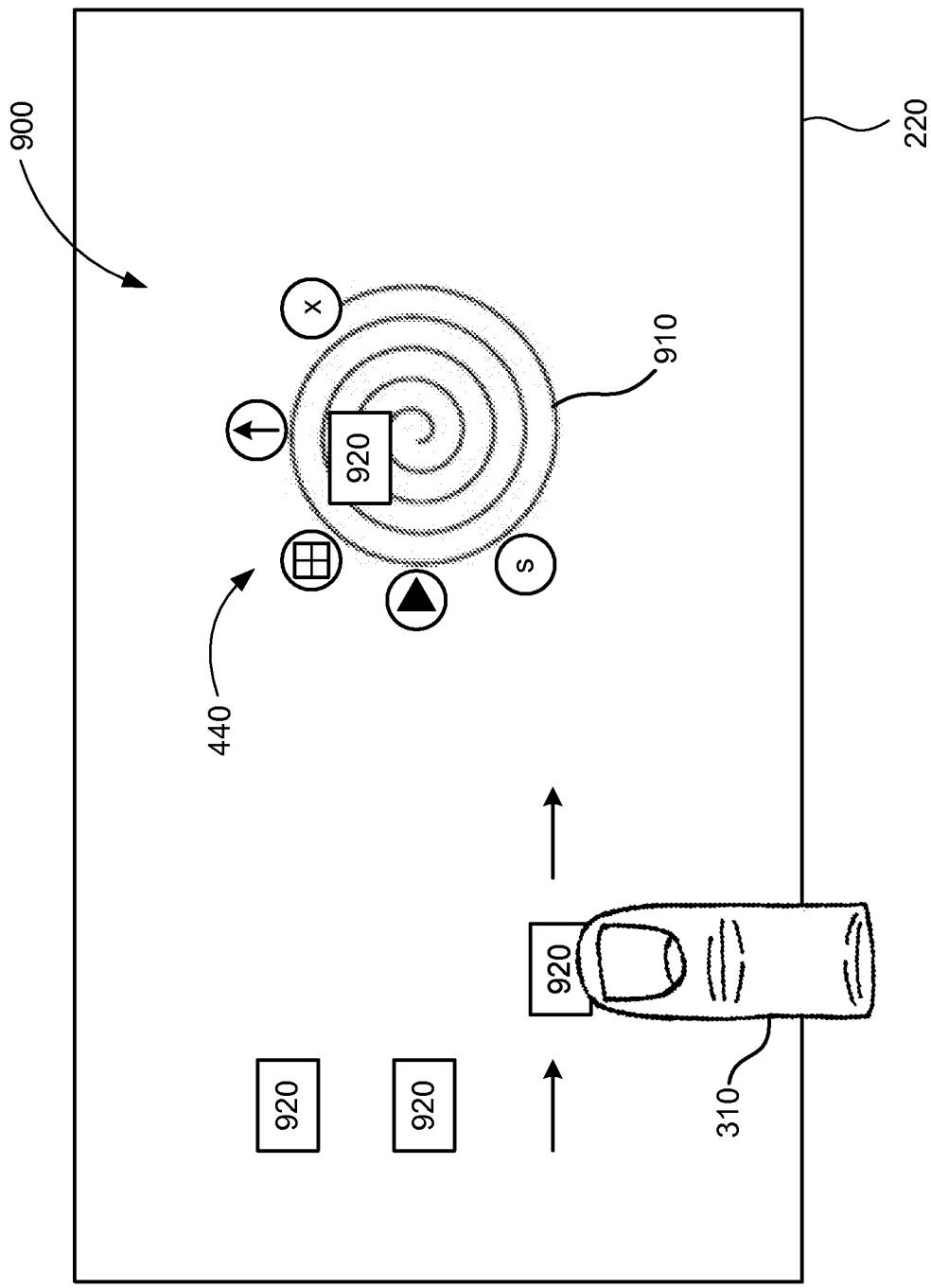
FIG. 9 illustrates an exemplary touch gesture interface operating in a batch processing mode.

FIG. 9 illustrates an exemplary touch gesture interface 900 operating in a batch processing mode. Touch gesture interface 900 may include a drop area 910 (represented as a spiral in FIG. 9) into which graphics displayed on touch screen 220 may be placed in anticipation of batch processing. FIG. 9 illustrates several graphics 920 displayed on the touch screen, with one of the graphics 920 already placed in drop area 910, and another of the graphics 920 being moved toward drop area 910 by a touch gesture of object 310 on the touch screen 220. Each of the graphics may be representative of and/or associated with an item such as a folder or file, for example.

Touch gesture interface 900 may further include selectable options 440 positioned about drop area 910. Each of the selectable options 440 may be associated with a function that may be applied to the items in drop area 910 when the corresponding selectable option 440 is selected. Examples of such functions may include, but are not limited to, functions for deleting, moving, playing, and packaging the items in drop area 910. A predefined script, such as described above (e.g., a user-defined publishing script), may also be associated with a selectable 440 and applied to items in drop area 910 when the selectable option 440 is selected. Accordingly, items may be placed in drop area 910 and a selectable option 440 selected to apply an associated function or script to the items in drop area 910.

Figure 10:
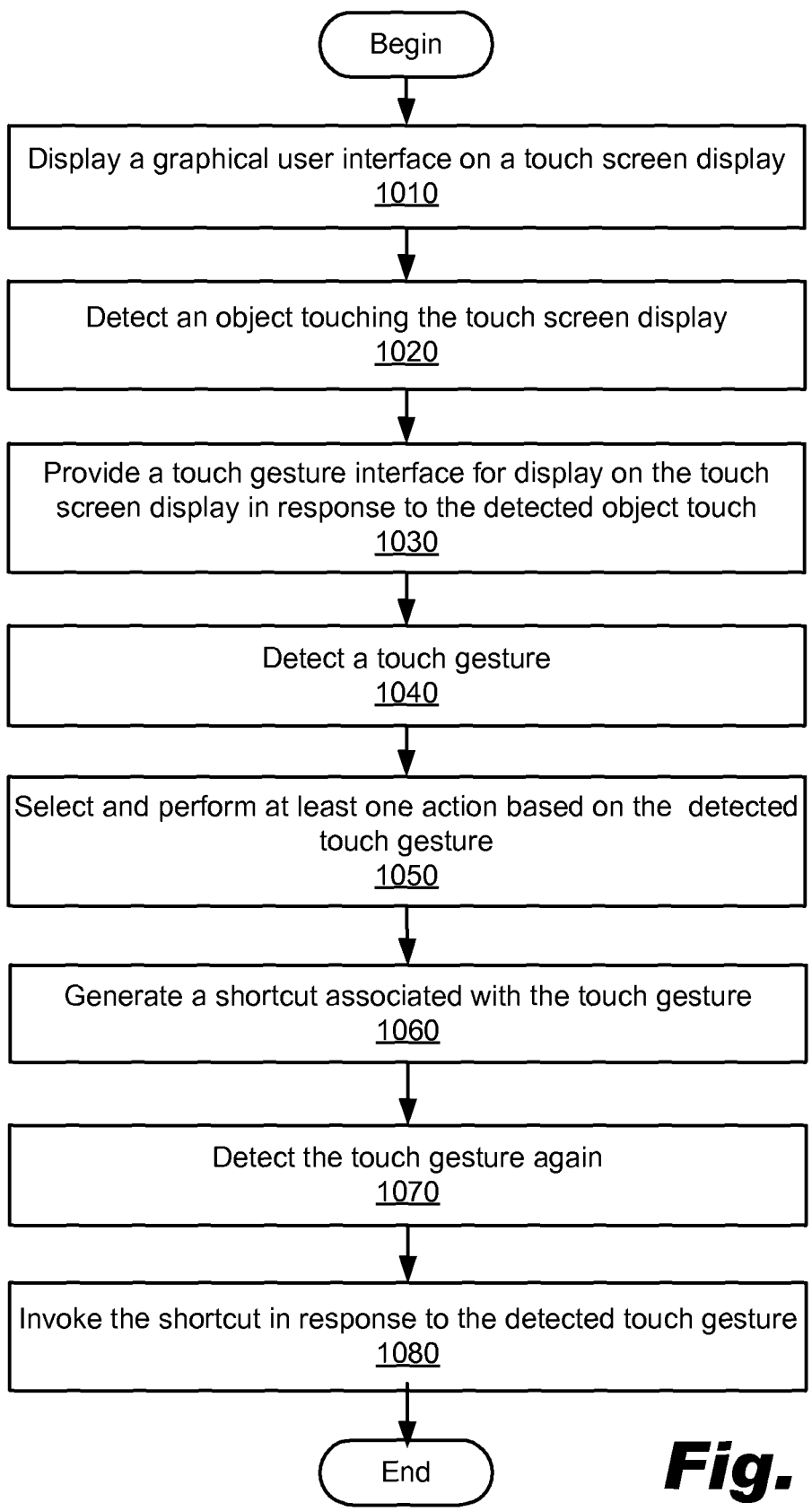
FIG. 10 illustrates an exemplary touch gesture interface method.

FIG. 10 illustrates an exemplary touch gesture interface method. While FIG. 10 illustrates exemplary steps according to one embodiment, other embodiments may omit, add to, reorder, and/or modify any of the steps shown in FIG. 10.

In step 1010, a GUI is displayed on a touch screen display. Step 1010 may be performed in any of the ways described above.

In step 1020, an object touching the touch screen display is detected. Step 1010 may be performed in any of the ways described above, including touch screen facility 150 sensing the object touch and signaling the user interface facility 160, which may detect the object touch from the signaling.

In step 1030, a touch gesture interface is provided for display on the touch screen display in response to the detected object touch. Step 1030 may be performed in any of the ways described above, including user interface facility 160 providing data representative of the touch gesture interface to touch screen facility 150, which may display the touch gesture interface on the touch screen display. Touch gesture interface may include any of the touch gesture interfaces described above or variations thereof. Touch gesture interface may include graphics representative of a plurality of selectable options 440, as described above.

In step 1040, a touch gesture is detected. Step 1040 may be performed in any of the ways described above, including touch screen facility 150 sensing the touch gesture and signaling the user interface facility 160, which may detect the touch gesture from the signaling. The touch gesture may include any of the touch gestures described above, or any variation thereof. For example, the touch gesture may include one or more directional touch gestures away from a position of the object touch.

In step 1050, at least one action is selected and performed based on the detected touch gesture. Step 1050 may be performed in any of the ways described above, including user interface facility 160 selecting and initiating performance of at least one action. The action(s) may include any of the actions described above, including, but not limited to, navigating (e.g., scrolling) through a plurality of selectable options 440, selecting a selectable option 440, and performing at least one function associated with the selectable option. Such a function may include, but is not limited to, any of the functions described above.

In step 1060, a shortcut associated with the touch gesture is generated. Step 1060 may be performed in any of the ways described above, including creating a shortcut to include an association between the touch gesture and at least one function, which may include any of the functions described above, or other functions. Step 1060 may be performed in response to a user utilizing a tool to provide input defining the shortcut and/or in response to the detected satisfaction of at least one predefined shortcut condition such as the detected touch gesture satisfying one or more predefined touch gesture usage, frequency, pattern, or history conditions.

In step 1070, the touch gesture is detected again. Step 1070 may be performed in any of the ways described above. In certain embodiments, the touch gesture is detected subsequent to generation of the shortcut in step 1060.

In step 1080, the shortcut is invoked in response to the touch gesture detection in step 1070. Step 1080 may be performed in any of the ways described above, including calling the shortcut which in turn calls at least one functions associated with the shortcut in step 1060.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method for defining and invoking a shortcut comprising:
    detecting an object touch on a touch screen display of a mobile device;
    displaying a touch gesture menu interface on said touch screen display of said mobile device in response to said object touch, said touch gesture menu interface comprising a first plurality of selectable options representing a plurality of user selectable operational modes of said mobile device on said touch screen display of said mobile device;
    tracking, on said touch screen display of said mobile device and while said touch gesture menu interface is displayed on said touch screen of said mobile device, a directional touch gesture in a direction away from a position of said object touch on a surface of said touch screen display of said mobile device and toward a selectable option included in said first plurality of selectable options displayed in said touch screen display of said mobile device, said selectable option representing an operational mode included in said plurality of operational modes of said mobile device;
    selecting said selectable option representing said operational mode based on said tracked directional touch gesture;
    defining, in response to said tracking of said directional touch gesture and said selecting of said selectable option based on said tracked directional touch gesture, said shortcut to include said tracked directional touch gesture associated with said selection of said operational mode;

after said defining of said shortcut, detecting said directional touch gesture on said touch screen display of said mobile device without displaying said touch gesture menu interface on said touch screen display of said mobile device; and invoking, in response to said detecting of said directional touch gesture after said defining of said shortcut, said shortcut to select said operational mode.

2. The method of claim 1, wherein said touch gesture menu interface includes graphics associated with said first plurality of selectable options.

3. The method of claim 2, further comprising displaying said graphics associated with said first plurality of selectable options about said position of said object touch in one of an arc shape and a circular shape.

4. The method of claim 3, wherein said directional touch gesture is in a radial direction away from said position of said object touch and toward one of said graphics associated with one of said first plurality of selectable options.

5. The method of claim 1, further comprising selecting at least one of said touch gesture menu interface and said first plurality of selectable options for said displaying based at least in part on a context of said object touch.

6. The method of claim 1, further comprising:

generating a script based on user input;

associating said script with said directional touch gesture; and executing said script in response to said detecting said directional touch gesture after said defining of said shortcut.

7. The method of claim 1, tangibly embodied as computer-executable instructions on at least one non-transitory computer-readable medium.

8. The method of claim 1, wherein said defining of said shortcut comprises:

learning said shortcut when said directional touch gesture satisfies one or more conditions to generate said shortcut; and generating, by said user interface facility, said shortcut.

9. The method of claim 1, further comprising providing, by a user interface facility, at least one tool configured to enable a user of said mobile device to define said shortcut.

10. The method of claim 1, further comprising:

tracking, by a user interface facility, said shortcut;

learning, by said user interface facility, another shortcut, said learning based on said tracking of said shortcut;

generating, by said user interface facility, said another shortcut based on said learning of said another shortcut.

11. The method of claim 1, wherein said first plurality of selectable options displayed in response to said object touch on said touch screen display of said mobile device visually indicates said plurality of user selectable operational modes around said object touch in a circle or an arc.

12. The method of claim 1, wherein said plurality of operational modes comprises a communications mode, an applications mode, and an entertainment mode.

13. The method of claim 12, wherein said invoking of said shortcut to select said operational mode comprises selecting one of said communications mode, said applications mode, and said entertainment mode.

14. The method of claim 1, wherein said defining of said shortcut to include said directional touch gesture associated with said selection of said operational mode includes:

identifying one or more conditions to be satisfied in order to generate the shortcut, the one or more conditions being specified by a shortcut definition heuristic; and determining that the one or more conditions have been satisfied.

15. The method of claim 1, wherein said defining of said shortcut to include said directional touch gesture associated with said selection of said operational mode is further based on receiving input from a user of said mobile device.

16. A method for defining and invoking a shortcut comprising:

detecting an object touching a position on a surface of a touch screen display of a mobile device;

displaying a touch gesture menu interface on said touch screen display of said mobile device in response to said object touch, said touch gesture menu interface comprising a first plurality of selectable options representing a plurality of user selectable operational modes of said mobile device on said touch screen display of said mobile device;

tracking a directional touch gesture on said surface of said touch screen display of said mobile device while said touch gesture menu interface is displayed on said touch screen display of said mobile device, said directional touch gesture beginning at said position of said object touch and moving away from said position in a direction toward a selectable option included in said first plurality of selectable options displayed in said touch screen display of said mobile device, said selectable option representing an operational mode included in said plurality of operational modes of said mobile device;

selecting said selectable option representing said operational mode based on said tracked directional touch gesture;

defining, in response to said tracking of said directional touch gesture and said selecting of said selectable option based on said tracked directional touch gesture, said shortcut to include said directional touch gesture associated with said selection of said operational mode;

after said defining of said shortcut, detecting said directional touch gesture on said touch screen display of said mobile device without displaying said touch gesture menu interface on said touch screen display of said mobile device; and invoking, in response to said detecting of said directional touch gesture after said defining of said shortcut, said shortcut to select said operational mode.

17. The method of claim 16, further comprising:

defining another shortcut to include another directional touch gesture associated with another selectable option included in said first plurality of selectable options;

after defining said another shortcut, detecting said another directional touch gesture on said surface of said touch screen display of said mobile device without displaying said touch gesture interface on said touch screen display of said mobile device; and invoking, in response to said detecting of said another directional touch gesture after said defining of said another shortcut, said another shortcut to select said another selectable option included in said first plurality of selectable options.

18. A system comprising:
a touch screen facility configured to
- sense an object touching a surface of a touch screen display of a mobile device, and
- provide signaling representative of said object touch;

a user interface facility configured to
- receive and use said signaling representative of said object touch to detect said object touch, and
- provide data representative of a touch gesture menu interface for display on said touch screen display of said mobile device in response to said object touch;

wherein said touch screen facility is further configured to
- display said touch gesture menu interface on said touch screen display of said mobile device, said touch gesture menu interface comprising a first plurality of selectable options representing a plurality of user selectable operational modes of said mobile device on said touch screen display of said mobile device,
- track, on said surface of said touch screen display of said mobile device and while said touch menu interface is displayed on said touch screen of said mobile device, a directional touch gesture in a direction away from a position of said object touch on said surface of said touch screen display of said mobile device and in a direction toward a selectable option included in said first plurality of selectable options displayed in said touch screen display, said selectable option representing an operational mode included in said plurality of operational modes of said mobile device,
- provide signaling representative of said tracked directional touch gesture to said user interface facility,
- define, in response to said tracking of said directional touch gesture, a shortcut to include said directional touch gesture associated with a selection of said operational mode,
- after said defining of said shortcut, sense, on said surface of said touch screen display of said mobile device, said directional touch gesture without displaying said touch gesture menu interface on said touch screen display of said mobile device,
- provide, in response to said sensing of said directional touch gesture after said defining of said shortcut, signaling representative of said directional touch gesture to said user interface facility; and wherein said user interface facility is configured to
- use said signaling representative of said directional touch gesture sensed after said defining of said shortcut to detect said directional touch gesture, and
- invoke, in response to said detection of said directional touch gesture after said defining of said shortcut, said shortcut to select said operational mode.

19. The system of claim 18, wherein said touch gesture menu interface includes graphics representative of said first plurality of selectable options displayed about said position of said object touch in one of an arc shape and a circular shape.

20. The system of claim 19, wherein said directional touch gesture is in a radial direction away from said position of said object touch and toward one of said graphics representative of one of said first plurality of selectable options.

* * * * *